United States Patent [19]

Aruga et al.

[11] Patent Number: 5,303,104
[45] Date of Patent: Apr. 12, 1994

[54] DISK DRIVE APPARATUS HAVING CARRIAGE DRIVING MECHANISM

[75] Inventors: Tomoe Aruga; Hideya Yokouchi, both of Suwa, Japan

[73] Assignee: Seiko Epson Corporation, Tokyo, Japan

[21] Appl. No.: 894,835

[22] Filed: Jun. 8, 1992

[30] Foreign Application Priority Data

| Jun. 10, 1991 | [JP] | Japan | 3-137396 |
| Jun. 10, 1991 | [JP] | Japan | 3-137397 |
| Jun. 10, 1991 | [JP] | Japan | 3-137398 |
| Jun. 10, 1991 | [JP] | Japan | 3-137399 |
| Jun. 24, 1991 | [JP] | Japan | 3-151526 |
| Jun. 24, 1991 | [JP] | Japan | 3-151527 |
| Apr. 24, 1992 | [JP] | Japan | 4-131552 |

[51] Int. Cl.$^5$ .................................. G11B 5/55
[52] U.S. Cl. ........................... 360/106; 360/107; 360/109; 74/89.17; 74/409
[58] Field of Search .............. 360/97.1, 106, 107, 360/109; 74/89.17, 409

[56] References Cited

U.S. PATENT DOCUMENTS

| 4,223,365 | 9/1980 | Moran | 361/71 |
| 4,257,286 | 3/1981 | Ohyama | 74/409 |
| 4,346,307 | 8/1982 | Zulaski | 307/130 |
| 4,428,012 | 1/1984 | Applequist et al. | |
| 4,528,607 | 7/1985 | Thompson | 360/106 |
| 4,609,959 | 9/1986 | Rudi | |
| 4,654,737 | 3/1987 | Hopkins et al. | 360/106 |
| 4,669,328 | 6/1987 | Kishi et al. | 74/409 |
| 4,774,614 | 9/1988 | Murakami et al. | 360/109 |
| 4,794,332 | 12/1988 | Schweitzer, Jr. | 324/133 |
| 4,984,124 | 1/1991 | Yeh | 361/59 |
| 5,003,426 | 3/1991 | Yeh et al. | 3611/59 |
| 5,032,941 | 7/1991 | Aruga et al. | 360/106 |
| 5,036,417 | 7/1991 | Aruga et al. | 360/106 |
| 5,103,365 | 4/1992 | Uchida et al. | 361/93 |
| 5,111,189 | 5/1992 | Yeh | 340/664 |
| 5,136,456 | 8/1992 | Yeh | 361/63 |
| 5,159,319 | 10/1992 | Dunk et al. | 340/646 |
| 5,267,117 | 11/1993 | Moore | 361/77 |

FOREIGN PATENT DOCUMENTS

| 57-167164 | 10/1982 | Japan . | |
| 0239973 | 11/1985 | Japan | 360/106 |
| 61-239466 | 10/1986 | Japan . | |
| 1-276473 | 11/1989 | Japan . | |

*Primary Examiner*—Thomas E. Denion
*Attorney, Agent, or Firm*—Oliff & Berridge

[57] ABSTRACT

A disk drive apparatus for recording and reproducing signals movement-positions a head, mounted on a carriage, in a disk radial direction with the aid of a pinion provided on an output shaft of a step motor and a rack provided on the carriage The rack is attached to the carriage through parallel leaf springs, and press-engages with the pinion by providing a pre-load to the rack via an elastic restoring force caused by flexure of the parallel leaf springs.

20 Claims, 20 Drawing Sheets

DISK DRIVE APPARATUS HAVING CARRIAGE DRIVING MECHANISM

CROSS REFERENCE TO RELATED APPLICATIONS

This application is related to U.S. patent application Ser. Nos. 07/894,834, entitled Disk Drive Apparatus Having Head Guard, to Tomoe Aruga et al. and 07/894,839, entitled Disk Driving Motor and Chucking Mechanism for Disk Drive Apparatus, filed concurrently herewith. These applications are incorporated herein by reference.

BACKGROUND OF THE INVENTION

1. Field of the Invention

The present invention relates generally to disk drive apparatus for recording and reproducing information on or from a floppy disk or the like, and more particularly, to improvements of heads and head seeking mechanisms used in disk drive apparatus.

2. Description of Related Art

The above-mentioned disk drive apparatus typically includes a magnetic head for recording and reproducing information, and a head seeking mechanism (carriage driving mechanism) for moving the head in the radial direction with respect to the disk. A known head seeking mechanism uses a rack and a pinion to move a carriage upon which a head is mounted. See, e.g., Japanese Laid-Open Patent Publication No. 276473/1989.

FIG. 24 is an exploded perspective view illustrating the carriage driving mechanism in this conventional disk drive apparatus. FIG. 25 is a vertical sectional view of FIG. 24.

As depicted in FIGS. 24 and 25, the conventional structure uses a pinion 502 provided on an output shaft of a step motor 501 to engage with a rack 504 provided on a carriage 503. The rack 504 is biased by a pre-load spring 505 in the direction of arrow u (toward pinion 502) of the figure, thereby giving a pre-load between the rack 504 and the pinion 502. Backlash which may occur between pinion 502 and rack 504 is thereby prevented. The carriage 503, upon which a head 506 is mounted, is accurately movement-positioned by rotation of the step motor 501.

Reaction against the pre-load applied between the rack 504 and the pinion 502 is received by a pulley 508 provided on the output shaft of the step motor 501. The carriage 503 is constructed so as to be slidable along a guide shaft 507.

As explained above, in the conventional device, if backlash is caused in the engagement of the rack 504 with the pinion 502, the rotation of the pinion 502 is not precisely transferred to the rack 504. Hence, the rack 504 is positively held against pinion 502 by the pre-load spring 505 so as not to cause backlash by giving the preload between the rack 504 and the pinion 502. The reaction thereof is received by the pulley 508. That is, pulley 508 prevents an excessive force from being applied by spring 505 to the drive shaft of motor 501 so that the drive shaft is not damaged.

Accordingly, the conventional carriage drive mechanism requires multiple members such as the pulley 508 and the spring 505 for providing a pre-load to the rack 504 and the pinion 502. This is a limiting factor in terms of miniaturizing and thinning of the disk drive apparatus. Further, the rack 504 and the carriage 503 can not be fixedly attached to each other in the above arrangement in order to apply the above-mentioned preload. It is required that the rack 504 be so constructed as to be movable relative to the carriage 503 (in the vertical direction in FIG. 1). However, the carriage 503 and rack 504 often become fixed to each other, leading to backlash, and therefore if employed for a long period of time, the positioning accuracy of the carriage 503 is deteriorated.

OBJECT AND SUMMARY OF THE INVENTION

It is an object of the present invention to provide a disk drive apparatus capable of having an improved head and carriage driving mechanism, having an increased reliability due to its simple structure, while also attaining miniaturization and thinning of the device as a whole.

To accomplish this and other objects, and to overcome the shortcomings set forth above, according to one aspect of the present invention, there is provided a disk drive apparatus for recording and reproducing signals by movement-positioning a head mounted on a carriage in a disk radial direction with the aid of a pinion provided on an output shaft of a step motor and a rack provided on the carriage. The rack is attached to the carriage through parallel leaf springs and press-engages with the pinion with a pre-load applied between the rack and the pinion by means of an elastic restoring force of the parallel leaf springs, which are flexed when the rack is engaged with the pinion.

The rack is, as described above, attached to the carriage through the parallel leaf springs The pre-load is provided to the rack by means of an elastic restoring force associated with flexure (bending) of the parallel leaf springs, whereby the rack press-engages with (is biased against) the pinion. Therefore, the rack can be press-engaged with the pinion constantly with a predetermined pressure by properly selecting flexure quantities of the parallel leaf springs. It is possible to provide a disk drive apparatus having a high reliability with a simple structure. Additionally, this arrangement permits the motor to be mounted so that the carriage driving mechanism, and thus the overall disk apparatus, can be made thinner.

BRIEF DESCRIPTION OF THE DRAWINGS

Other objects and advantages of the present invention will become apparent during the following discussion taken in conjunction with the accompanying drawings, in which like reference numerals refer to like elements and wherein.

DETAILED DESCRIPTION OF THE PREFERRED EMBODIMENTS

A disk drive apparatus according to the present invention will hereafter be described in detail by way of illustrative embodiments.

Figure 1:
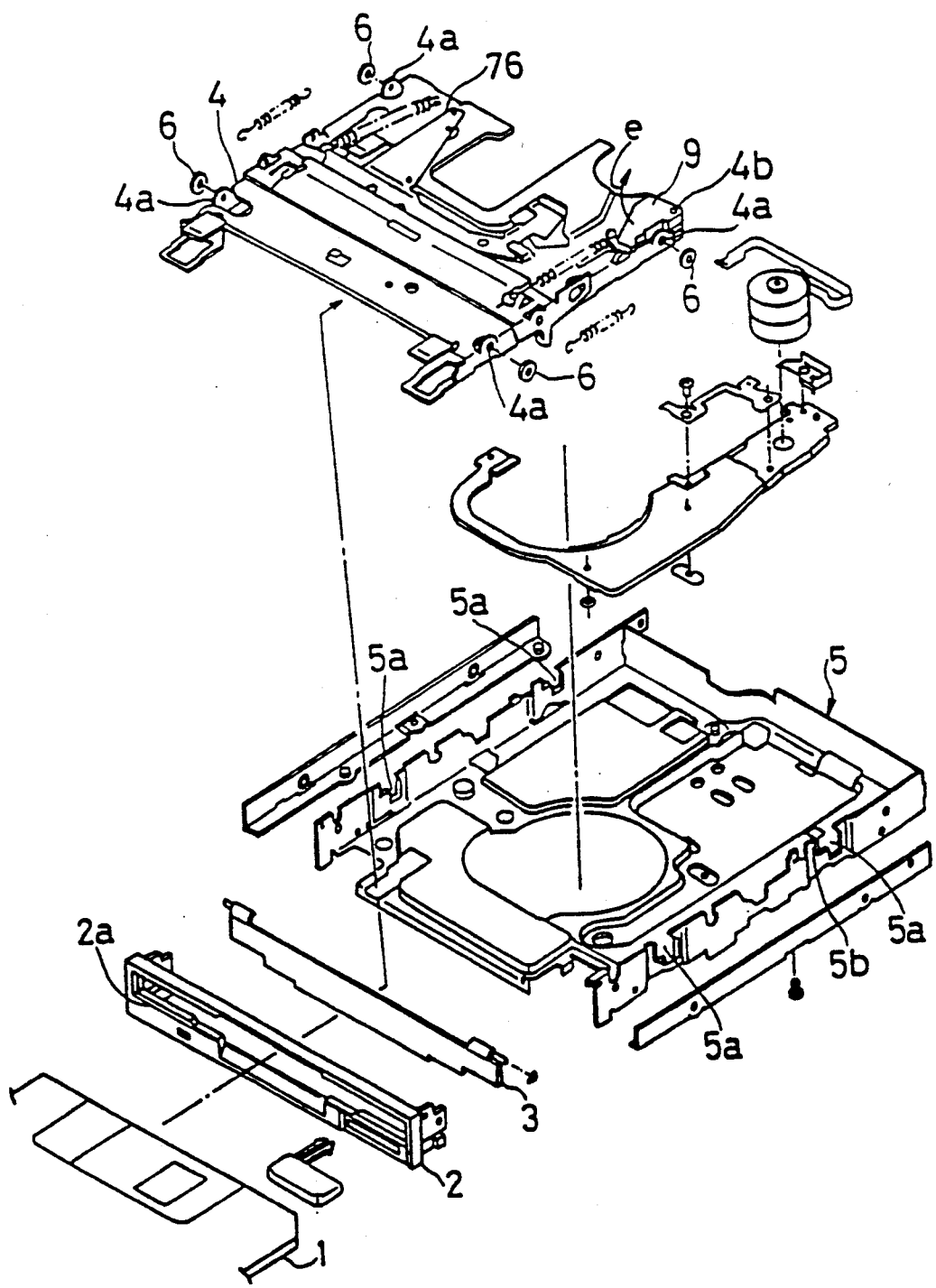
FIG. 1 is a partial exploded perspective view showing one embodiment of a disk drive apparatus according to the present invention.
Figure 2:
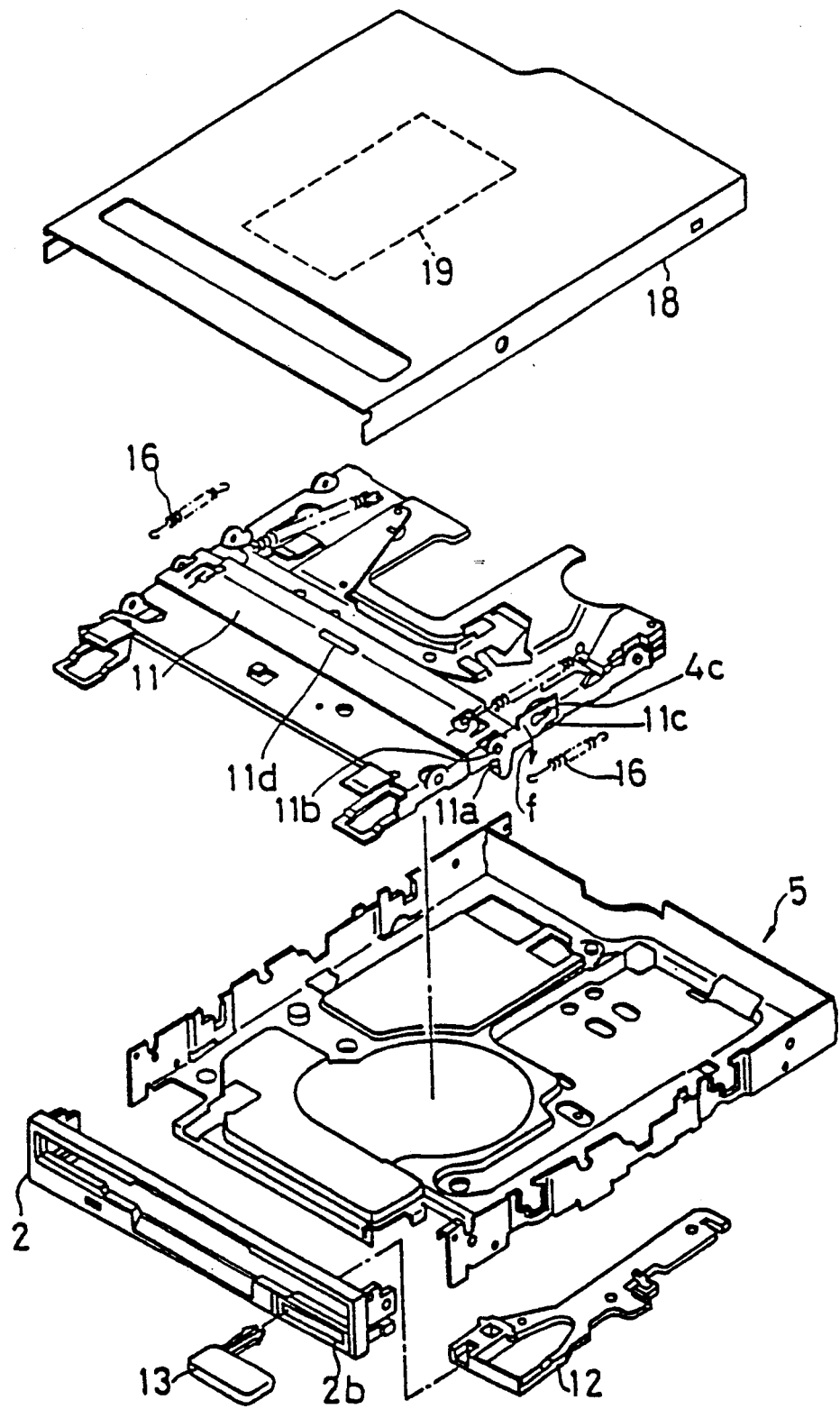
FIG. 2 is an exploded perspective view illustrating other portions of the above-mentioned embodiment.

FIGS. 1 and 2 are exploded perspective views showing one embodiment of the disk drive apparatus of the present invention. Designated at 1 in FIG. 1 is a jacket (cartridge), for accommodating a disk (unillustrated), constructed such that the cartridge 1 is inserted into a holder 4 through an opening 2a formed in a front bezel 2 while depressing a bezel shutter 3.

Structurally, the holder 4 is mounted on a lower shield case 5 so that the holder can be located and held selectively in a disk inserting/removing position where the cartridge 1 can be placed into the holder 4 or taken out of it and a recording/reproducing position where the desired information is recorded on or reproduced from the disk within the cartridge 1. The holder 4 includes four protrusions 4a provided on the side faces thereof on which guide rollers 6 are mounted so as to be rollable thereon. The guide rollers 6 are placed in four guide grooves 5a formed in the lower shield case 5 and are thus guided in grooves 5a.

Figure 3:
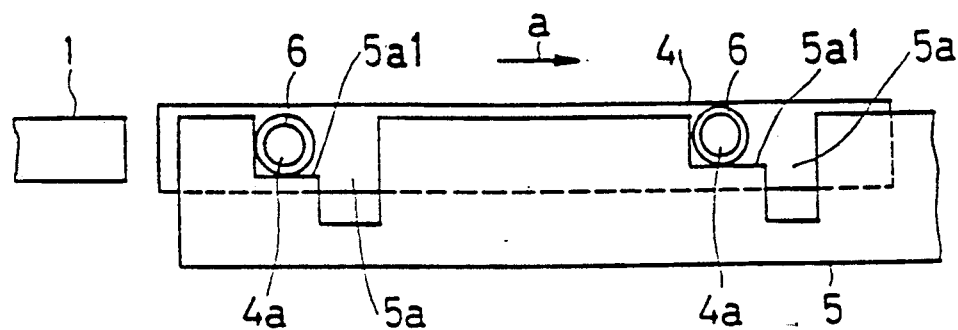
FIG. 3 is a schematic side view illustrating a disk cartridge inserting/removing position of a disk holder in the embodiment described above.
Figure 4:
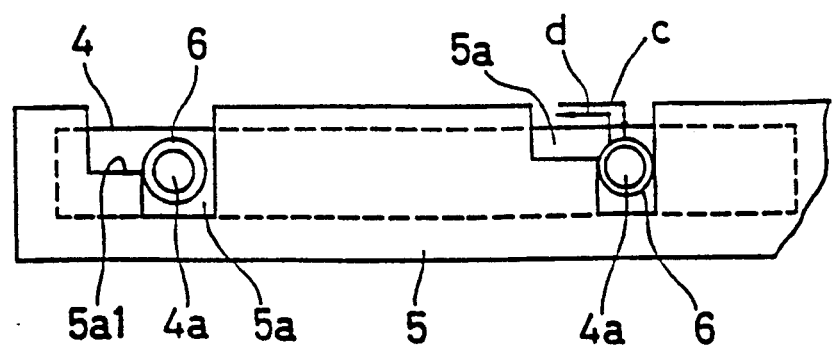
FIG. 4 is a schematic side view depicting a recording/reproducing position of the disk holder in the embodiment described above.

FIGS. 3 and 4 are views schematically illustrating the manner in which holder 4 is selectively located and held in the disk inserting/removing position and the recording/reproducing position. FIG. 3 shows a state where the holder 4 is in the disk inserting/removing position. FIG. 4 depicts a state where the holder 4 is in the recording/reproducing position.

In the state where the holder 4 is in the inserting-/removing position, shown in FIG. 3, each protrusion 4a of the holder 4 is placed on a receiving portion 5a1 of its respective guide groove 5a. Mounted on each protrusion 4a is the guide roller 6 for reducing a slide resistance to movement in guide grooves 5a.

In this state, when moving the holder 4 in an arrowed direction a of FIG. 3 after inserting the cartridge 1 into the holder 4, the protrusions 4a of the holder 4 come off the receiving portions 5a1 of the guide grooves 5a and move as indicated by an arrow c of FIG. 4. The structure is such that the cartridge within the holder 4 is thus set into the recording/reproducing position.

Further, a trigger 9 is, as illustrated in FIG. 1, fitted to the holder 4, and is rotatable about a pivot point 4b so as to prevent each guide roller 6 from coming off the receiving portion 5a1 of the guide groove 5a due to an impact or the like (when the cartridge is not inserted in holder 4, i.e., when holder 4 is in the inserting/removing position) should holder 4 attempt to move in the arrowed direction a of FIG. 3. One end of the trigger 9 engages with a stopper member 5b of the lower shield case 5, to thereby prevent undesired movement of the holder 4.

The trigger 9 is structured such that the trigger engaging with the stopper member 5b of the lower shield case 5 rotates in an arrowed direction e of FIG. 1 when a lower portion thereof (not shown) is contacted by a leading edge of cartridge 1 upon insertion of the cartridge 1 into the holder 4. The trigger 9 thereby disengages from the stopper member 5b of the lower shield case 5; and the cartridge 1 can be, as illustrated in FIG. 4, moved to the recording/reproducing position.

The following is an explanation of the movements which occur during removal of the cartridge 1. Referring to FIG. 2, a press member 11a of a lifter 11 penetrates a bore formed in the lower shield case 5 and engages with an eject arm 12 extending along the lower surface of the lower shield case 5. An eject button 13 is connected to the eject arm 12. The press member 11a of the lifter 11 is pushed via the eject arm 12 by depressing the eject button 13. The lifter 11 rotates about the protrusion 11b provided on the lifter 11, thereby lifting a lift member 11c of the lifter 11 and a lift pin 4c of the holder 4 (which is pivotally engaged in a slot of lift member 11c). Consequently, the holder 4 is raised, while the guide roller 6 is placed on the receiving portion 5a1 of the guide groove 5a of the lower shield case 5 and moves in the direction of arrow d in FIG. 4, thus providing a function of ejecting the cartridge Note that the lifter has lifter springs 16 stretched between the lower shield case 5 and the lifter itself. The lifter 11 is thus biased to rotate in an arrowed direction f of FIG. 2 due to springs 16. For this reason, as described above, the holder 4 is movable to the recording/reproducing position by insertion of the cartridge 1. For a more detailed description of the movement of holder 4, see the above-incorporated U.S. patent application No. 07/894,834. Referring further to FIG. 2, the eject button 13 is constructed so that its outer diameter is smaller than the button hole 2b formed in the front bezel 2. The eject arm 12 and the eject button 13 are structured to be joined through a snap fit. Therefore, the structure is such that when attaching the eject button 13 during assembly, the front bezel 2 can be attached beforehand to the lower shield case 5, and then eject button 13 is attached to eject arm 12 while being guided by the button hole 2b. This improves the ease of attachment of the eject button is reduced in thickness, which is the trend in facilitating smallness both in size difficult as the eject button is reduced in thickness, which is the trend in facilitating smallness both in size and in thickness. Additionally, even if the specification of the disk device changes, the eject button can be replaced without demounting the front bezel.

A shield case 18 is mounted to engage with the upper surface of the lower shield case 5 for the purpose of preventing entrance of (electromagnetic) noise and dust from outside, and also for preventing damage of the components located in the interior of the disk drive apparatus due to rough treatment thereof. Adhered to an inner surface of the shield case 18 is a runner sheet 19, which serves as a slide face member for reducing a slide resistance of objects against the inside of case 18, and for securing an insulating property of case 18. Runner sheet 19 is provided for the purpose of sliding against an upper carriage of the carriage driving mechanism (which will be described later) and for reducing both a frictional coefficient and a load between shield case 18 and lifter 11 when the shield case 18 is deformed due to an external force applied thereto. Further, the lifter 11 is provided with a receiving protrusion 11d, which prevents deformation of the shield case 18 by receiving the load from shield case 18 when an external force is applied to the shield case 18. Even if the shield case 18 rubs on the receiving protrusion 11d, the low friction runner sheet 19 prevents deterioration which may otherwise be caused by friction.

A description of a disk driving motor for rotationally driving the disk, and a disk chucking mechanism for holding the disk when rotationally driving the disk by the motor will next be provided.

Figure 5:
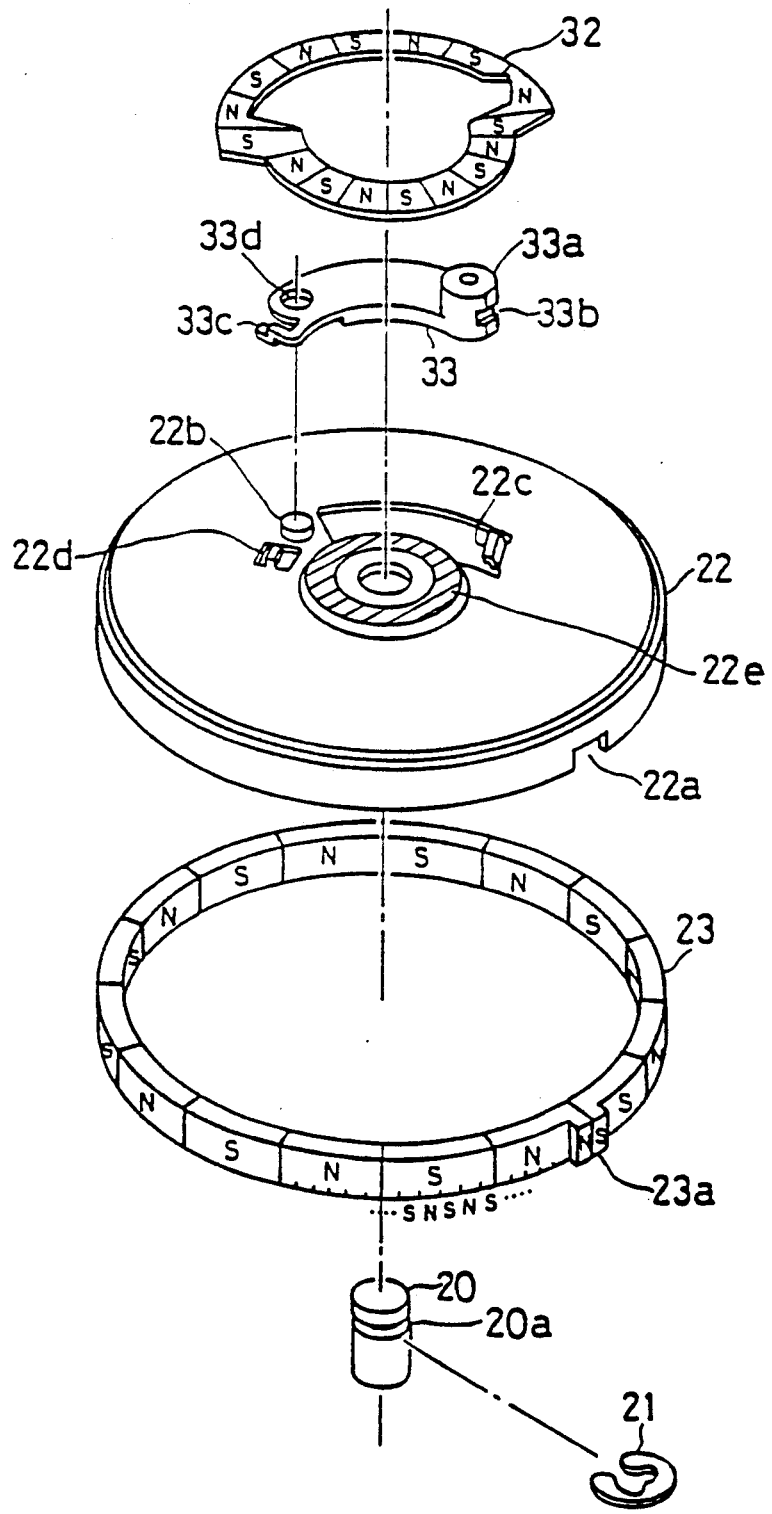
FIG. 5 is a partial exploded perspective view depicting a rotor and chucking mechanism for a disk driving motor in the embodiment described above.
Figure 6:
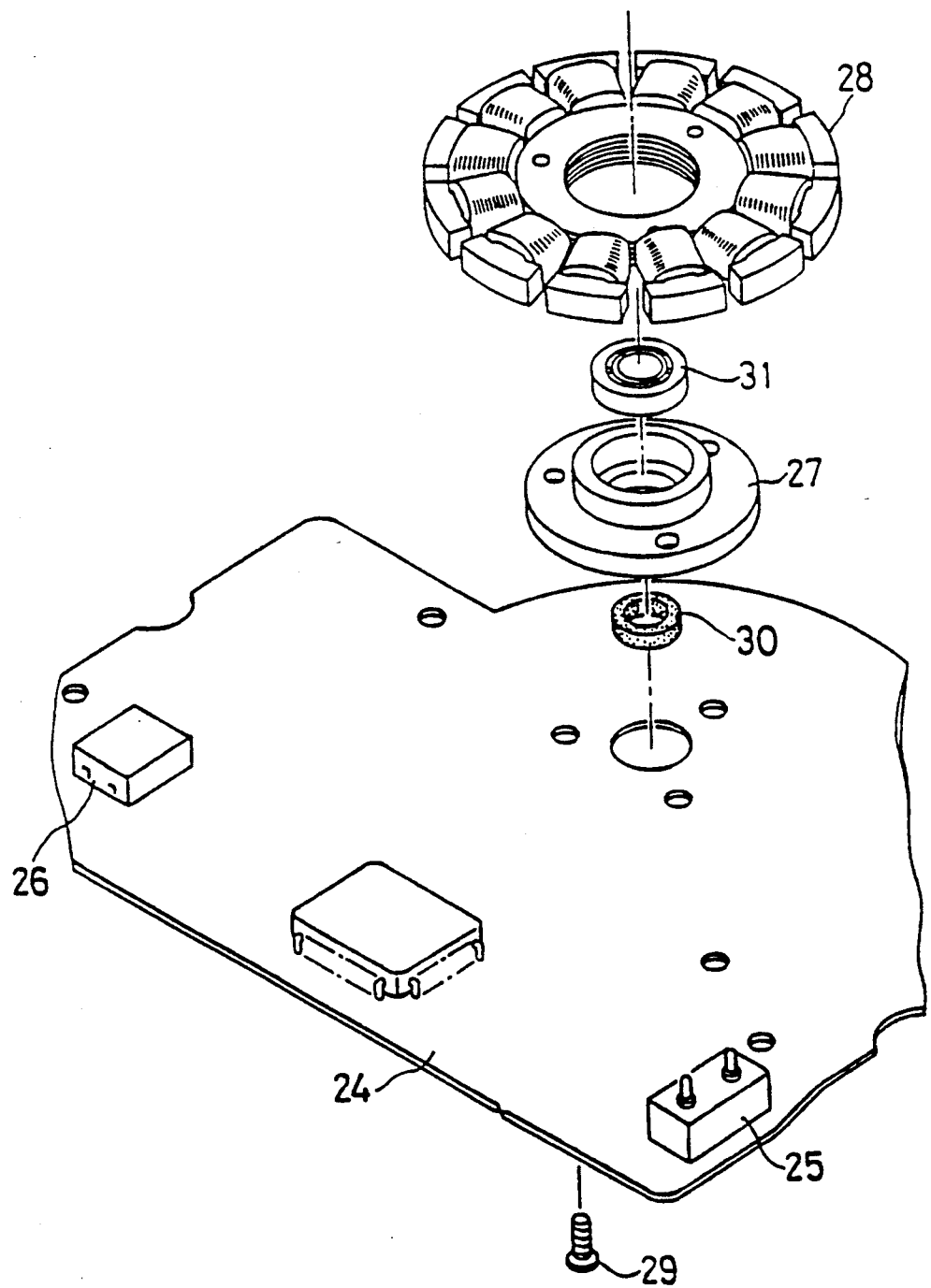
FIG. 6 is a partial exploded perspective view of the stator and mounting structure of the disk driving motor in the embodiment described above.

FIGS. 5 and 6 are exploded perspective views each illustrating portions of the disk driving motor. The motor is a spindle motor in the present embodiment. The disk chucking mechanism is mounted on a rotor of the motor.

A spindle, generally indicated at 20 in FIG. 5, functions to center the disk by engaging a central hole of a metallic disk hub (unillustrated) fixedly bonded to the center of the disk housed in the cartridge whose illustration is omitted in FIG. 5. A rotor 22 of the spindle motor for driving the disk is press-fitted on spindle 20.

The disk drive apparatus is advantageously reduced in thickness, in response to the recent demand for a reduction in thickness of computers. With this demand for thinness, it is a common recognition to those who design disk drive apparatus that the spindle motor is the portion where the reduction in thickness is required most. For this reason, the thickness of the rotor 22 of the spindle motor is decreased down to the smallest value which is allowable in terms of design. In accordance with this embodiment, an iron plate having a thickness of 0.5 mm is used. However, when press-fitting such a thin iron plate onto the spindle 20, a length in the axial direction of the spindle which engages the rotor is small, and hence it is impossible to secure the rotor 22 to the spindle 20 so that rotor 22 extends in a plane perpendicular to the spindle axis.

For this reason, a groove 20a for receiving an E-shaped snap ring is formed in the spindle 20. An E-shaped snap ring 21 is placed in groove 20a. Groove 20a is machined by, e.g., a lathe, so that the groove extends in a plane perpendicular to the axis of spindle 20. Then, in accordance with this embodiment, after snapping snap ring 21 in groove 20a, rotor 22 is press-fitted onto spindle 20 until the rotor 22 is closely fitted to the upper surface of the E-shaped snap ring. Hence, if there is no unevenness in thickness of the E-shaped snap ring, the rotor 22 can be press-fitted thereto and extend from the spindle with the same high accuracy (and in the same perpendicular plane) as the groove 20a.

As described above, the high accuracy mounting of rotor 22 to spindle 20 can be obtained, and hence the upper surface of the rotor 22 can be employed directly as a receiving surface for contacting the disk hub. It is also possible to enable good securement between the disk and a recording/reproducing head.

Although in the illustrated embodiment, the E-shaped snap ring is employed, a C-shaped snap ring or other shaped snap rings may also be used.

Turning to FIG. 5, the numeral 23 represents a rotor magnet, bonded to the rotor 22, for generating torque of the motor described above. The rotor magnet 23 has a protrusion 23a at one place on its outer peripheral portion, thereby effecting positioning with respect to a notch 22a of the rotor 22. This protrusion is bipolar-magnetized. An unillustrated magnetic sensor (mounted, for example, adjacent to rotor 22 on motor mount 24) generates one signal (referred to as an index signal) for every rotation of the rotor.

This bipolar magnetization is matched in phase with a driving magnetization effected on an inner surface of the rotor magnet 23, thereby obtaining a greater magnetic force.

Additionally, the lower surface (as viewed in FIG. 5) of rotor magnet 23 (which is opposite to a motor mount 24 shown in FIG. 6) is magnetized to exhibit a plurality of poles which are used for speed detection. These poles are illustrated by the S and N notations below rotor magnet 23. A sufficient number of poles are provided on the rotor magnet 23 in this way, so that only one magnet can be effectively used.

Referring to FIG. 6, mounted on the motor mount 24 are a detection switch 25 for detecting that the cartridge 1 has been placed in the recording/reproducing position shown in FIG. 4, and an operation indicating lamp connector 26. A housing 27 and a stator 28 wound with a coil are fixed onto the central part of the motor mount with three countersunk screws 29.

A metal bearing 30 and a ball bearing 31 are press-fitted into the housing 27. The structure is such that an outside diameter of the ball bearing 31 is larger than that of the metal bearing 30. Therefore pressure on the ball bearing 31 is received by an outer ring of the ball bearing 31. In accordance with this embodiment, the housing 27 is formed of plastic, whereby the ball bearing readily can be press-fitted therein without causing significant deformation or damage to housing 27. The above-mentioned spindle 20 is inserted into these bearings.

The aforementioned spindle motor is, as explained earlier, equipped with a disk chucking mechanism. The construction of the chucking mechanism will hereinafter be described with reference to FIGS. 5 and 7.

A chucking magnet 32 is adhered to the upper surface of the rotor 22, and is annular so that it has a hole through which the upper surface of the rotor can be seen. Located in this hole is a chucking lever 33 for rotationally driving and centering the disk by engaging with a drive hole of the disk hub (which is offset from the spindle receiving central hole thereof).

This chucking lever 33 is secured to the rotor 22 by fitting a guide member 22c consisting of an extension of the rotor 22 into a groove 33b formed in a drive pin member 33a of the chucking lever 33, in combination with a pivot point 22b provided on the rotor 22. A disengagement preventive lever member generally indicated at 33c is provided in the vicinity of aperture 33d of the chucking lever 33. Aperture 33d is pivotally attached to pivot point 22b. The lever member 33c contacts the lower part of a disengagement preventive pawl 22d of the rotor 22, thus preventing aperture 33d from disengaging the pivot point 22b due to, for example, externally originating impacts.

The above-described chucking lever 33 is a unitary structure made from plastic. The disengagement preventive lever member 33c is structured so that the lever member 33c is placed under the disengagement preventive pawl 22d during assembly. Further, for receiving the disk hub, a coating 22e of a material exhibiting a good sliding property (low friction) for contacting the disk hub is applied on the upper surface of the rotor 22. This coating 22e is applied in a circumferential configuration so as to be coaxial with the spindle 20.

Next, the disk chucking mechanism will be explained in greater detail with reference to FIGS. 7, 8 and 9.

Figure 7:
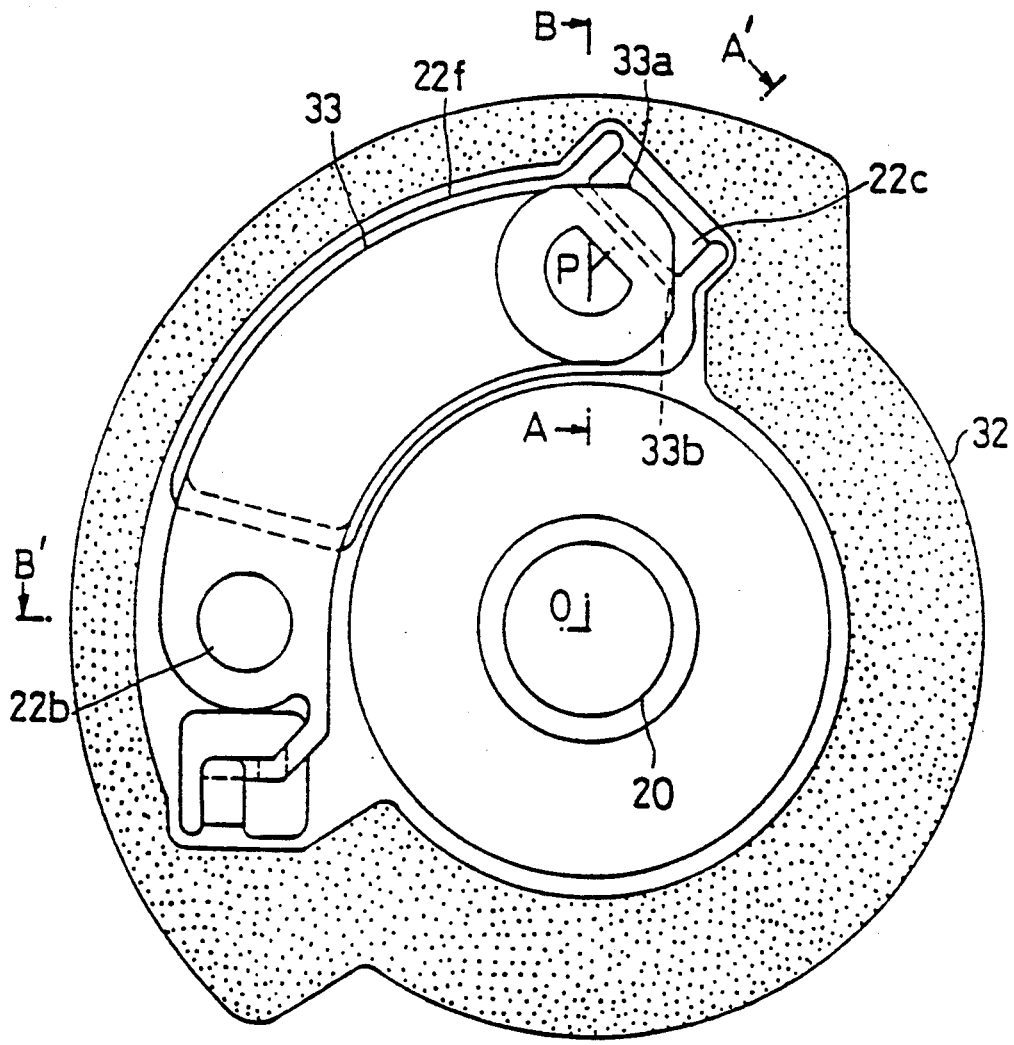
FIG. 7 is an enlarged plan view depicting a chucking mechanism in the embodiment described above.

FIG. 7 is an enlarged plan view of the chucking mechanism of FIG. 5 assembled on the rotor. FIG. 8 is a sectional view taken substantially along the line A-P-A' of FIG. 7. FIG. 9 is a sectional view taken substantially along the line B-P-0-B' of FIG. 7.

Referring to FIG. 7, the stippled portions of the chucking magnet 32 are magnetized so as to uniformly attract the disk hub with respect to the center of the spindle 20. The chucking lever 33 is constructed so as to be capable of pivoting by a necessary amount about the pivot point 22b within a hole 22f formed in the rotor 22 in a plane parallel to the upper surface of rotor 22.

Figure 8:
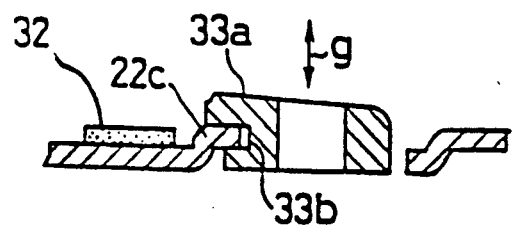
FIG. 8 is a sectional view taken substantially along the line A-P-A' of FIG. 7.

On the other hand, in the thrust (axial) direction of the spindle 20 (i.e., perpendicular to the plane containing the upper surface of rotor 22), the rotary guide member 22c consisting of the extension of the rotor 22, engages with the groove 33b formed in the drive pin member 33a of the chucking lever 33, preventing movement of drive pin 33a in the thrust direction (arrowed direction g of FIG. 8).

Figure 9:
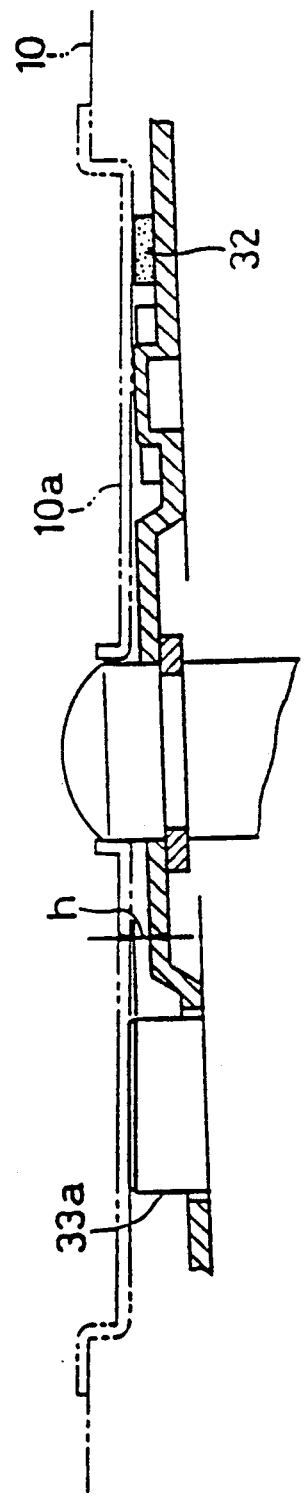
FIG. 9 is a sectional view taken substantially along the line B-P-0-B' of FIG. 7.

With the above-described construction, as depicted in FIG. 9, a hub 10a of the disk 10 is, as depicted in FIG. 9, attracted by the chucking magnet 32. In this case, generally the drive hole of the disk hub does not initially coincide with the drive pin member 33a. Therefore, the disk hub 10a rides on the upper surface of the drive pin member 33a and is thus inclined. However, after rotation of rotor 22 relative to hub 10a, the drive pin member 33a engages with the drive hole of the disk hub thereby chucking the disk hub.

Prior to engagement of drive pin 33a with the disk hub drive hole, the disk hub slides on the upper surface of the drive pin member 33a causing friction in some cases. Therefore, the upper surface of the drive pin member 33a is slightly inclined to widen a contact area with the disk hub (thus reducing the force-per-area applied to the surface of pin 33a). The inclination described above was optimized at 2 ± 1.5 degrees.

Additionally, there is a possibility that the disk hub 10a contacts the chucking magnet 32 when it is inclined as described above. If the chucking magnet 32 is made from a material exhibiting a large frictional coefficient as in the case of, e.g., a rubber magnet, the disk hub rotates together with the chucking magnet 32, resulting in a situation where the drive pin member 33a can not engage with the drive hole of the disk hub. To overcome this problem, a low friction sheet is adhered onto the upper surface of the chucking magnet 32 to provide a good sliding property; or alternatively a low friction coating is applied thereon. When using a plastic magnet such as a Nylon plastic magnet, the magnet itself exhibits a good sliding property, and the above-described process is not required.

It has been determined that an engagement quantity of the disk hub with the drive pin member 33a (shown as h in FIG. 9) is preferably set to be no more than 0.7 mm in order to effect stable chucking by reducing the inclination of the disk hub.

Based on the above-mentioned chucking structure, the space for the chucking portion can be also effectively utilized. It is possible to attain 40 mm as an outside diameter of the rotor of the motor, and 4 mm as a thickness from the bottom of the motor mount 24 to the upper surface of the rotor 22.

Further, separate members such as a pivot pin, a drive pin and a variety of springs, required in previous devices, are not required for the chucking mechanism. A unitary plastic chucking lever can be obtained. A remarkably simple construction is provided, which improves the reliability and reduces the cost as well.

Figure 10:
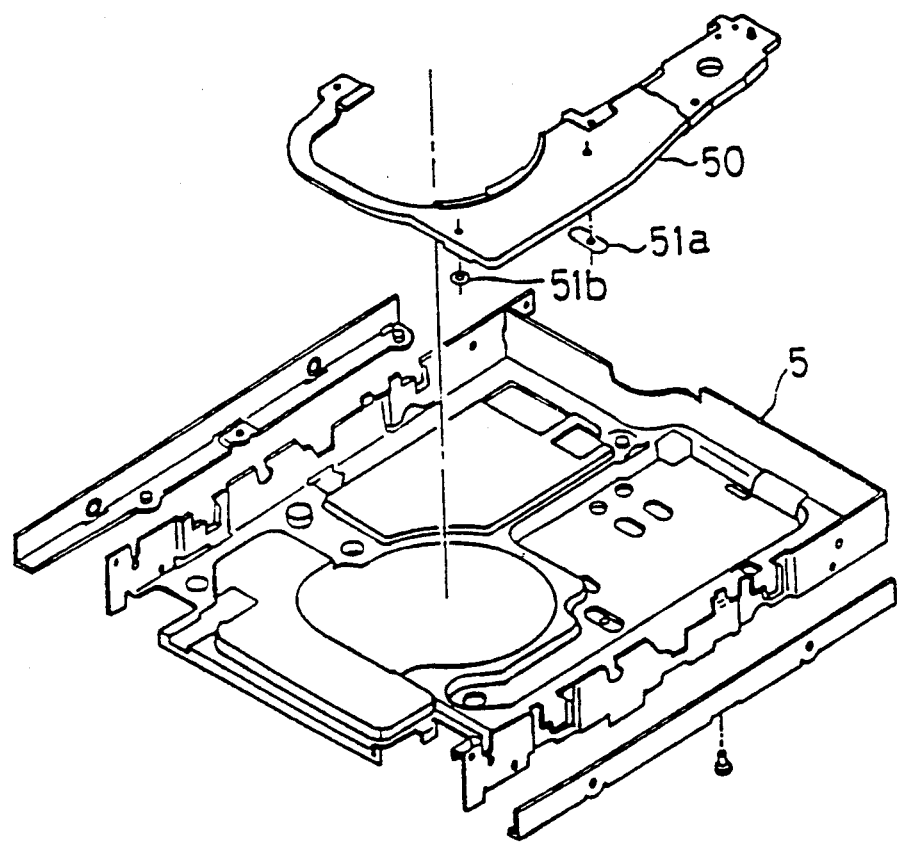
FIG. 10 is an exploded perspective view showing the mounting of a disk drive mechanism and control board to a shield case and base in the above embodiment.
Figure 10:
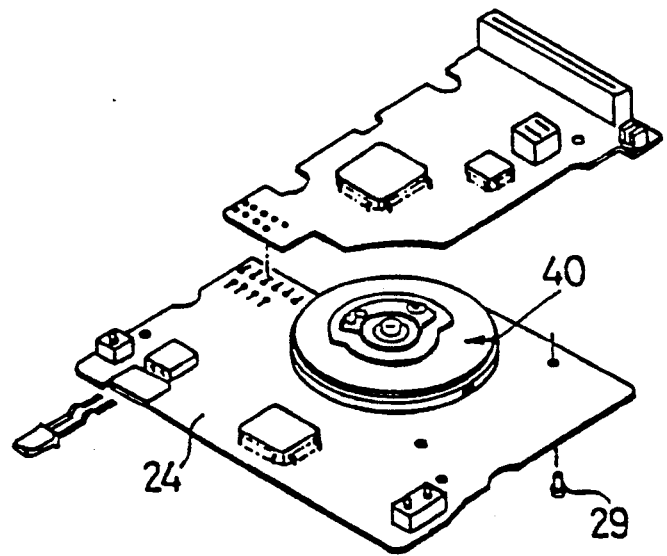

FIG. 10 is an exploded perspective view showing a state where the spindle motor, also referred to as a disk drive motor 40, as described above is incorporated into the disk drive apparatus.

The spindle motor 40 constructed as described above is disposed on the motor mount 24. The mount 24 is secured to a base 50 with three countersunk screws 29 from the underside of the lower shield case 5. In this case, countersinking is not effected on the motor mount 24. Instead, holes having a diameter slightly smaller than a head diameter of the countersunk screws 29 are bored in motor mount 24, thus restricting a pop-out quantity of the countersunk screw 29. Further, the base 50 is formed of a plastic in this embodiment to attain a reduction in weight, which has been increasingly demanded with the miniaturization of computers.

Figure 11:
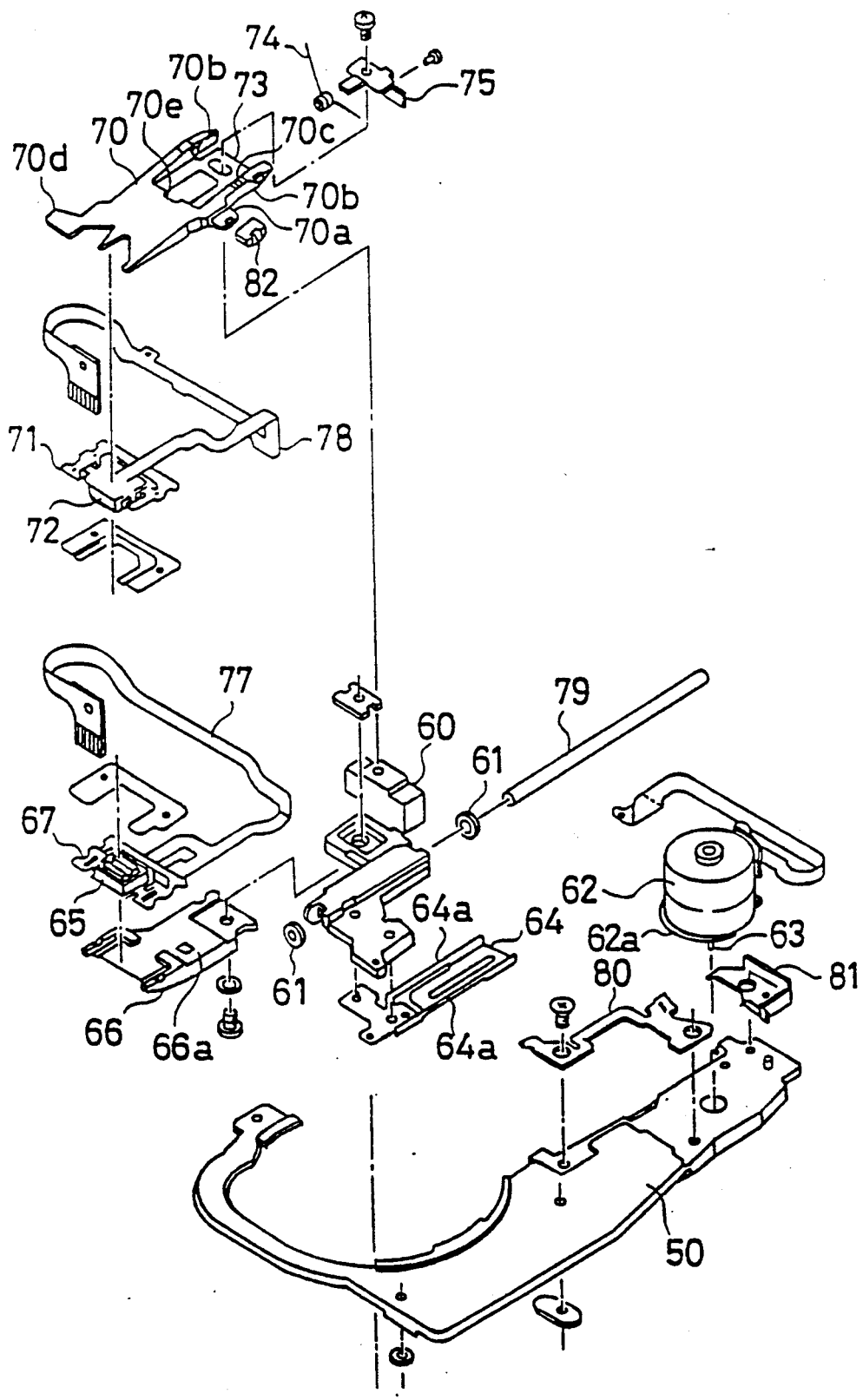
FIG. 11 is an exploded perspective view of one example of a head seeking mechanism (carriage driving mechanism) according to the present invention.

The spindle motor 40 is attached to the base through the lower shield case 5. Hence, as illustrated in FIG. 11, it is difficult to accurately obtain a high accuracy of alignment between a lower head 65 mounted on the base 50 and the disk receiving surface 22e (shown in FIG. 5) of the spindle motor 40. If the situation remains as it is, it is not possible to secure a good contact of the disk with the head. This leads to a deterioration of the reliability on the disk drive apparatus. For this reason, in accordance with this embodiment, shims 51a, 51b for adjusting the height between the base 50 and the lower shield case 5 are inserted therebetween. The height between the head and the spindle motor is adjusted by selecting an appropriate thickness of shims 51a, 51b, thus securing good contact of the disk with the head.

Figure 12:
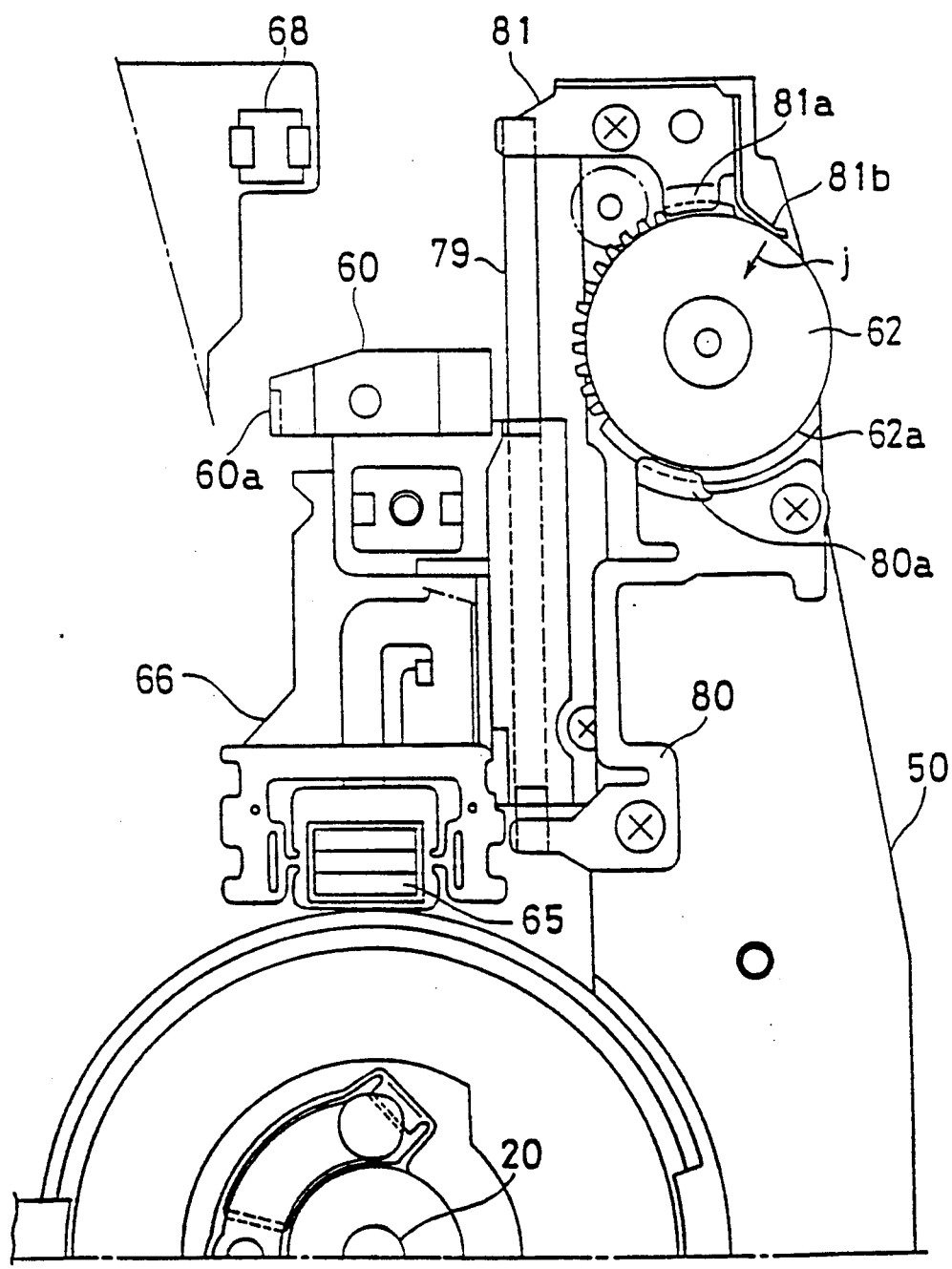
FIG. 12 is an overhead plan view of a lower carriage unit of the present invention.
Figure 13:
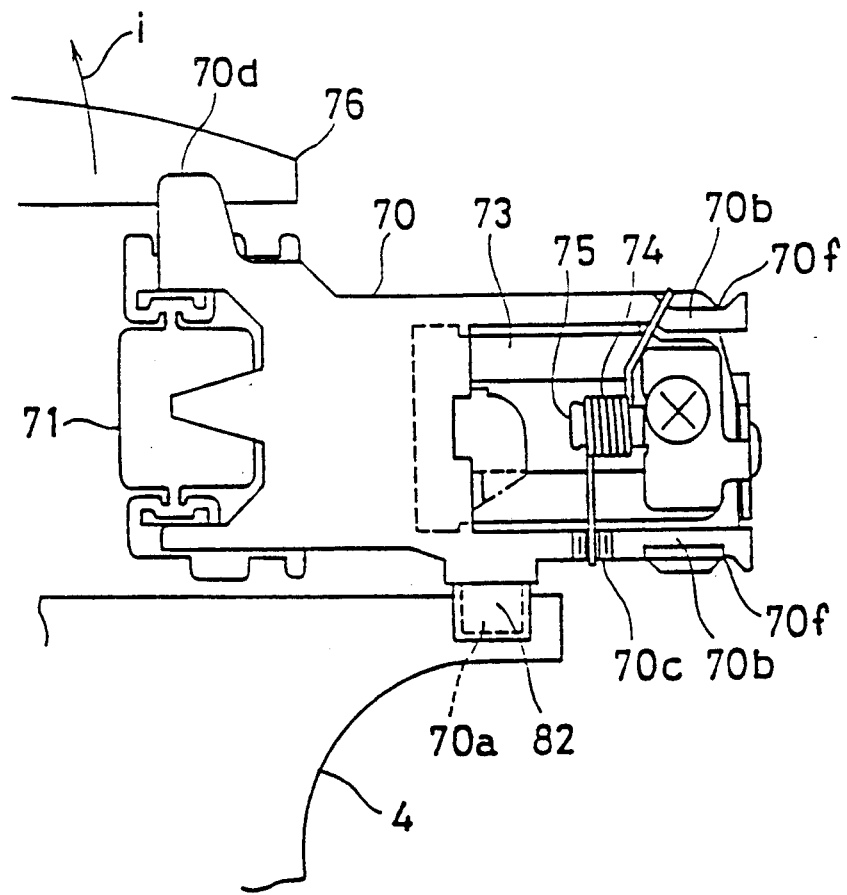
FIG. 13 is an overhead plan view of an upper carriage unit of the present invention.
Figure 14:
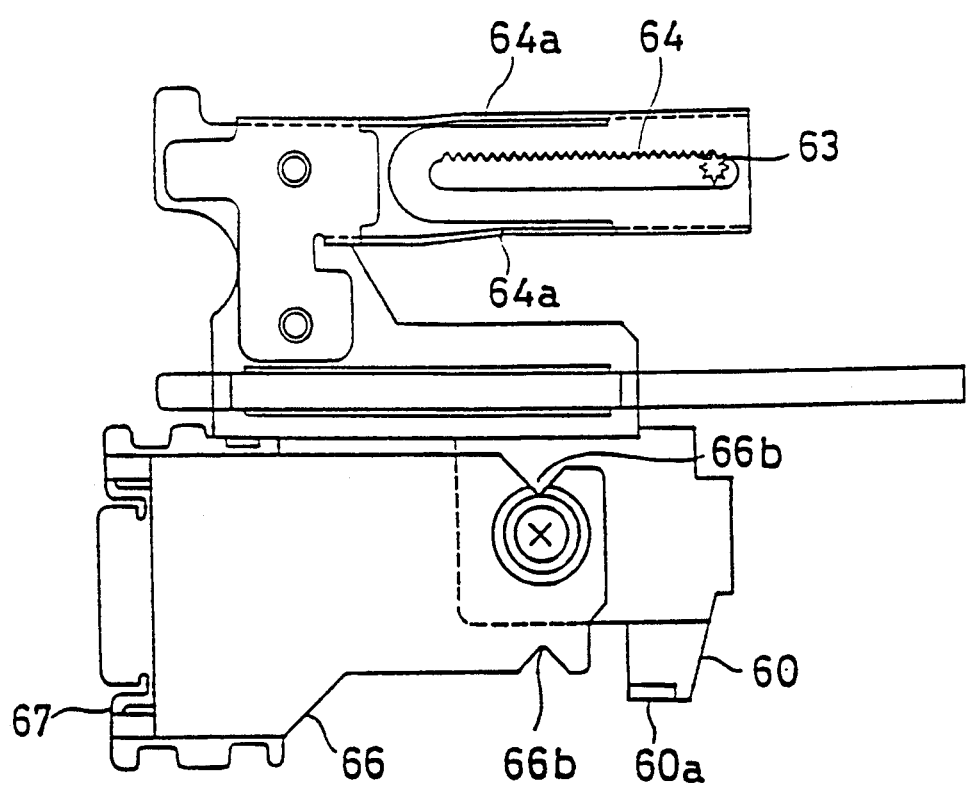
FIG. 14 is a bottom view of the lower carriage unit and attached rack.

Next, an illustration of a carriage drive mechanism in the disk drive apparatus of this invention will be described. FIG. 11 is an exploded perspective view showing one example of the carriage drive mechanism according to the present invention. FIG. 12 is a plan view illustrating a lower carriage unit. FIG. 13 is a plan view showing an upper carriage unit. FIG. 14 is a bottom view showing a carriage and a rack.

Referring to FIGS. 11 and 14, a sintered metal bearing 61 for guiding the movement of a carriage base 60 in the radial direction of the disk is press-fitted into the carriage base 60. A rack 64 is also attached to carriage base 60 for movement-positioning the carriage by engaging with a pinion 63 provided on an output shaft of a step motor 62 which serves for movement-positioning of the carriage base 60.

The rack 64 is attached at the top ends of two parallel leaf springs 64a so that the rack 64 and the pinion 63 can be driven relative to each other with no backlash by providing a pre-load between rack 64 and pinion 63. The pre-load is provided between rack 64 and pinion 63 because they are attached to each other so that parallel leaf springs 64a are flexed (bent), as best shown in FIG. 14. Accordingly, rack 64 and pinion 63 operate to accurately movement-position the carriage. Further, when an impact acts on the carriage base 60, the parallel leaf springs 64a deform to relieve the impact force. It is therefore possible to provide a disk drive apparatus resistive to impacts received, for example, when being carried, which is demanded especially for small-sized thin type computers.

A lower carriage 66 serving as a first carriage unit is fixed to the carriage base 60 with a screw so that the lower carriage is movable in the disk radial direction integrally with the carriage base 60. Bonded to the top end of the lower carriage 66 is a lower head 65 for recording and reproducing signals with respect to the disk. Lower head 65 is attached to lower carriage 66 via a gimbal spring 67 comprised of a thin leaf spring for keeping proper, biased contact of the head with the disk. Additionally, as illustrated in FIGS. 12 and 14, a shutter 60a for cutting off an optical sensor 68 used to detect that the base 60 has moved to a reference position, is integrally constructed in a part of the carriage base 60.

Referring to FIGS. 11 and 13, in a manner similar to the lower head 65, an upper head 72, fitted to a gimbal spring 71, is bonded to an upper carriage 70 serving as a second carriage unit. The upper carriage 70 is provided with a fulcrum portion 70b which functions as a rotary fulcrum when upper carriage 70 is pivoted by contact between raised member 70a and the above-described holder during setting or ejecting of the cartridge (this will be described in more detail below). The upper carriage 70 is connected to the carriage base 60 through a suspension 73, such as a leaf spring, whereby it is so constructed as to be openable and closable.

A carriage slider 82 formed of a material different from carriage 70, and exhibiting a good sliding property, is fixed, based on a snap-fit structure, to the raised member 70a. Carriage slider 82 and raised member 70a are disposed at a substantially middle point between the upper head of the upper carriage 70 and the suspension 73 in order to slide with the holder 4.

A head load spring 74 is provided on a suspension support 75 (which clamps suspensions 73 to an upper portion of carriage base 60 as shown in FIG. 11) to preload upper head 72 in the direction of the disk so that a sufficient contact pressure is imparted to the disk by the lower head 65 and the upper head 72. Particularly, a spring catching member 70c of the upper carriage 70 (best shown in FIG. 13) has three catching positions and is structured to infinitesimally adjust the pressure exerted on the head. A head load center associated with the head load spring 74 is placed in an interior of a triangle defined by connecting the raised member 70a of the upper carriage 70 and two fulcrums 70b. With this arrangement, even though carriage 70 is raised adjacent one side portion thereof by the raised member 70a, the upper carriage 70 is not raised with an inclination but it raised horizontally.

Figure 19:
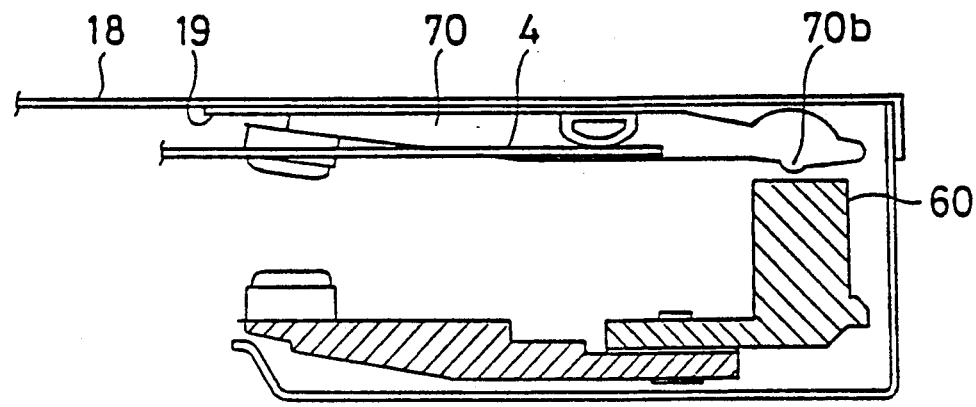
FIG. 19 is a side sectional view of the carriage, illustrating movement of the upper carriage due to the holder.

Moreover, when impact is exerted from outside of the device causing a portion of the upper carriage 70 to be raised by contact of holder 4 with the raised member 70a, the top end of the upper carriage 70 (the end containing head 72) is lowered, while the fulcrum 70b is lifted from carriage base 60 and floats (see FIG. 19).

In an extreme case, it is possible that the lower head 65 may collide with the upper head 72, resulting in damage to the heads. For this reason, the upper carriage 70 includes a protrusion 70d, provided at its top end which is structured to engage with a portion of a shutter lever 76 provided on the holder 4 illustrated in FIG. 1. If a large impact is applied on the disk drive apparatus, contact between protrusion 70d and the portion of shutter lever 76 prevents excessive descent of the upper carriage 70 so as to prevent collision between the upper and lower heads, and damage thereto as well. For a more detailed description of this head protecting feature, see the above-incorporated U.S. patent application No. 07/894,834.

As a matter of course, when the disk cartridge is inserted into the holder 4, the shutter lever 76 moves in an arrowed direction i in FIG. 13 and disengages from the protrusion 70d of the upper carriage 70. The upper carriage is thereby allowed to freely descend, whereby the upper head 72 can contact the disk.

Referring to FIG. 11, upper and lower flexible printed-circuit boards 77, 78 for connecting the control circuits to the heads extend from the upper and lower heads 72, 65. The printed-circuit boards are thin and flexible so as not to restrict the movement of the heads. The lower carriage 66 is provided with a clamp member 66a for holding the flexible printed-circuit board 77. The flexible printed-circuit board 78 for the upper head 72 is guided by a catching member 70e of the upper carriage 70, thus keeping constant a predetermined configuration of the flexible printed-circuit board 78 adjacent to upper carriage 70.

Turning to FIGS. 11 and 12, the carriage base 60 is guided in the disk radial direction by means of a slide shaft 79 and is thus movably mounted. The slide shaft 79 is attached to the base 50 through slide shaft clamps 80, 81.

A step motor 62 for movement-positioning the carriage base 60 along the axial direction of the slide shaft 79 rotates stepwise through, for example, 18 degrees for each step. A pinion 63 provided on the output shaft of step motor 62 engages with the rack 64 provided on the carriage base 60. The structure is such that carriage 60 moves by one disk track every time the step motor rotates stepwise.

Further, the step motor 62 is fixed to the base 50 by holding a flange 62a thereof with presser spring members 80a, 81a of the slide shaft clamps 80, 81.

Turning next to FIG. 12, adjustment of the respective components will be explained including those needed for use with the disk drive apparatus.

As explained earlier, the lower and upper carriages 66, 70 are constructed so as to be adjustable independently of the carriage base 60.

Referring to FIG. 12, the operation starts with a reference track detector adjustment (referred to as a 00 adjustment). The shutter 60a provided on the carriage base 60 is used in performing, as described above, an adjusting function. The adjustment is made by rotating the step motor 62 until the shutter 60a cuts off the optical sensor 68 when carriage 66 is in a reference position.

Thus, the carriage is moved to a reference position by rotating the step motor 62 until sensor 68 detects shutter 60a. The position of the head is adjusted in an offset position (in the circumferential direction), at an angle (azimuth), and in off-track position (in the radial direction) with respect to the center of the spindle 20.

There are two methods for accomplishing this adjustment. To start with, peripheral-direction reference signals (referred to as burst signals) of two positions on the inner and outer peripheries of the disk are written to the disk for performing an examination. An offset of the head is determined by reading these signals. This method will be explained in greater detail below.

Figure 15:
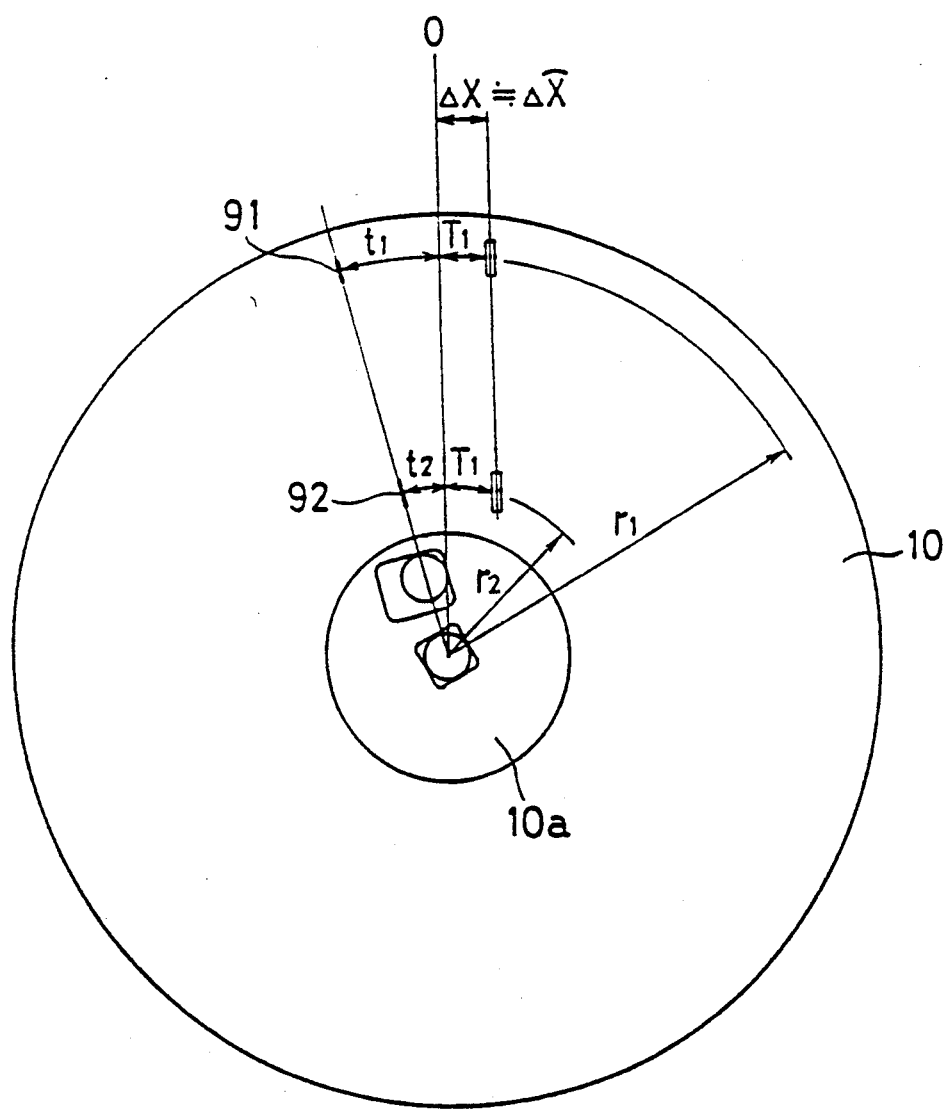
FIG. 15 is a plan view of a disk, explaining offset determination using burst signals.

FIG. 15 is a plan view of the disk for use in explaining determination of the offset of the head using burst signals.

In FIG. 15, the burst signals 92, 91 are written in the positions corresponding to an inner peripheral radius r2 and an outer peripheral radius r1 along a radial line of the disk. In this state, the burst signals on the disk are read, wherein the index signal described with reference to FIG. 5 (output for each revolution of disk driving motor 40) serves as a trigger. Thereupon, if the magnetic head is in the originally normal position 0 and moves between the inner and outer peripheries, the burst signals are generated at timings t1, t2. The angles are equalized, and the time is also the same. Hence, t1 = t2 if the head is at the normal position 0.

However, if the head is positioned away $\Delta X$ from the normal position 0, the generation periods of the burst signals are given by t1 + T1, and t2 + T2, respectively. The angles are different, and hence the time is not the same.

From this time difference, $\Delta X$ can be obtained by using the following formula. Namely, supposing that the disk cycle is set to a seconds, this can be expressed such as:

$$T1 = a \times \frac{\Delta \hat{X}}{2\pi r1}$$

$$T2 = a \times \frac{\Delta \hat{X}}{2\pi r2}$$

Further, a difference between the inner and outer peripheral burst signals can, as is obvious from FIG. 15, when t1 = t2, be expressed such as:

$$(t1 + T1) - (t2 + T2) = t1 + a \times \frac{\Delta \hat{X}}{2\pi r1} -$$

$$\left(t2 + a \times \frac{\Delta \hat{X}}{2\pi r2}\right) = \frac{a}{2\pi} \left(\frac{r2 - r1}{r1 \times r2}\right) \times \Delta \hat{X}$$

Herein, if $a/2 (1/r1 + r2) = k$ (constant).

$$(t1 + T2) - (t2 + T2) = Kx\Delta \hat{X}$$

$$\Delta \hat{X} = \Delta X$$

$$(t1 + T2) - (t2 + T2) = Kx\Delta X$$

In this manner, the offset of the head can be known from the time difference between the inner and outer peripheral burst signals, and the carriage can be adjusted to place carriage 60 at normal position 0.

Explained next is another method of determining the offset of the head while reading angular deviation signals (referred to as azimuth signals) of the head with respect to the spindle center which have been written on the inner and outer peripheries of the disk.

Figure 16:
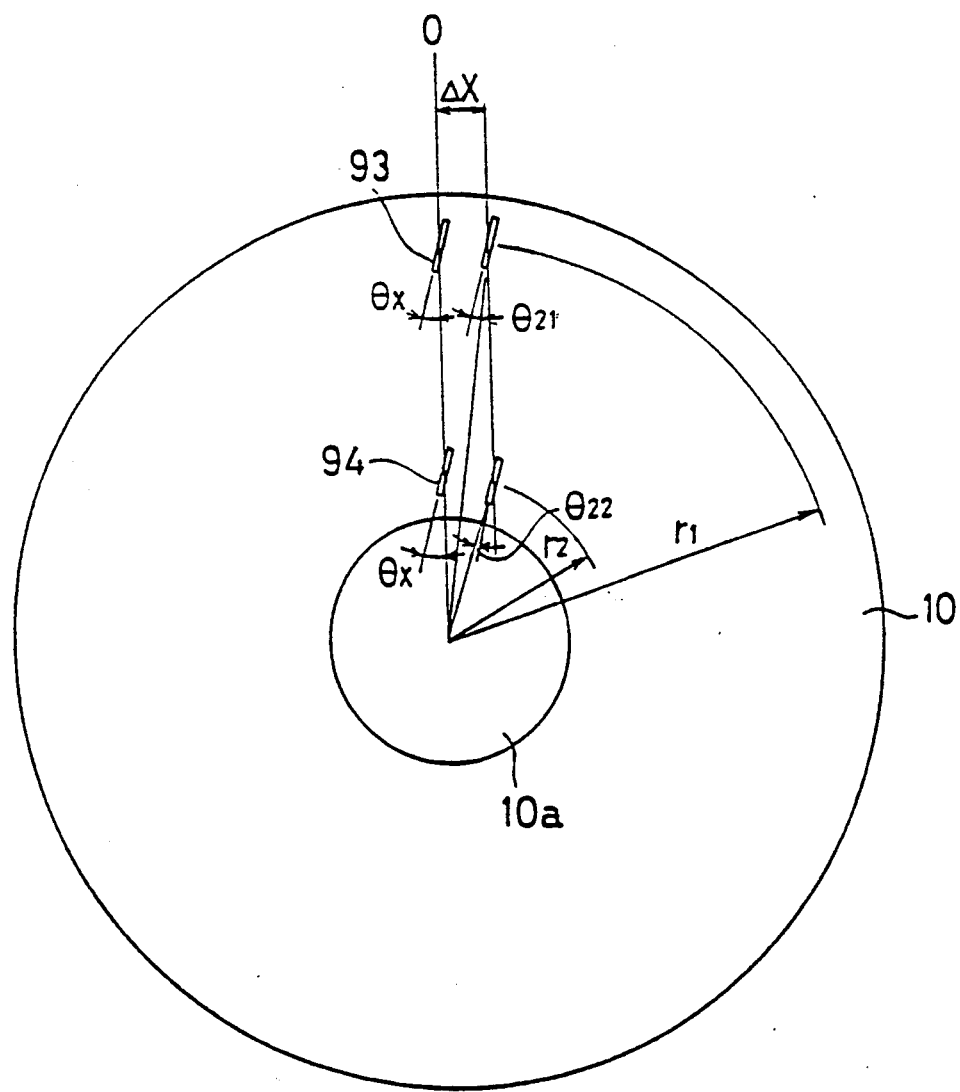
FIG. 16 is a plan view of the disk, explaining offset determination using azimuth signals.

FIG. 16 is a plan view of the disk 10, for use in explaining determination of the offset of the head using the azimuth signals. Further, FIG. 17 is an enlarged detailed view of FIG. 16.

Referring to FIG. 16, the azimuth signals are written in the positions on the inner peripheral radius r2 and the outer peripheral radius r1 of disk 10. In this state, when reading the azimuth signals on the disk, and if the magnetic head is in the originally normal position 0 and moves along the outer and inner peripheries 93, 94, the azimuth signals are indicated by $\theta x$. No change is therefore made in the mounting of carriage 60.

However, when the head is positioned away $\Delta X$ from the normal position 0, the azimuth signals become $\theta 21$, this angular difference, $\Delta X$ can be obtained by using the following formula.

Figure 17:
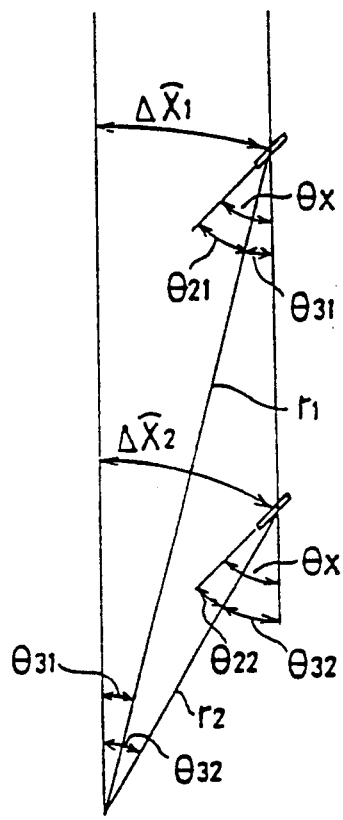
FIG. 17 is an enlarged partial view of FIG. 16.

Namely, referring to FIG. 17, $$\theta 21 + \theta 31 = \theta x, \text{ and}$$

$$\theta 22 + \theta 32 = \theta x$$

Hence, $$\theta 21 - \theta 22 = \theta 32 - \theta 31$$

Further, this can be expressed such as:

$$r1 \times \theta 31 = \Delta \hat{X} 1$$
$$r2 \times \theta 32 = \Delta \hat{X} 2$$
$$\Delta \hat{X} 1 \approx \Delta \hat{X} 2 = \Delta X$$

$$\theta 21 - \theta 22 = \frac{\Delta X}{r2} - \frac{\Delta X}{r1}$$

$$= \left(\frac{r1 - r2}{r2 \times r1}\right) \times \Delta X$$

$$\frac{r1 - r2}{r2 \times r1} = K$$

$$\theta 21 - \theta 22 = Kx\Delta X$$

In this manner, the offset of the head can be known from the inner and outer peripheral azimuth signals.

Then, when the offset of the head is known, the offset of the head, the head angle (azimuth) and the position (off-track) from the center may be adjusted, adjacent to a V-groove 70f of the upper carriage 70 of FIG. 13 and V-groove 66b formed in the lower carriage 66 of FIG. 14.

A detailed description of the adjustment thereof is omitted, because the details are well known and provided in "Everything About Floppy Disk Device" published by CQ Publishing Company.

Performed generally in the above-described adjustment is a method of making the adjustment by rotating the step motor 62 while it is energized for adjusting the carriage position. The pinion 63 shown in FIG. 14 rotates by rotating the step motor 62, and the rack 64 engaging therewith moves, thus effecting the positional adjustment of the carriage. As illustrated in FIG. 12, however, the flange member 62a of the step motor 62 is toothed, thereby facilitating an adjustment by an automated jig.

The step motor 62 is inserted in a hole formed in the base 50. There exists a clearance between the hole and the motor shaft. Therefore, a pre-load is applied in an arrowed direction j of FIG. 12 by means of a pre-load spring member 81b provided on a portion of the slide shaft clamp 81 to eliminate this clearance during adjustment. With the above-described structure, the step motor 62 is not required to be refixed after the adjustment has been made. Since the position can be held by the spring, a deviation of the adjusting position is not caused due to refixing, and thus highly accurate adjustment is attainable.

Figure 18:
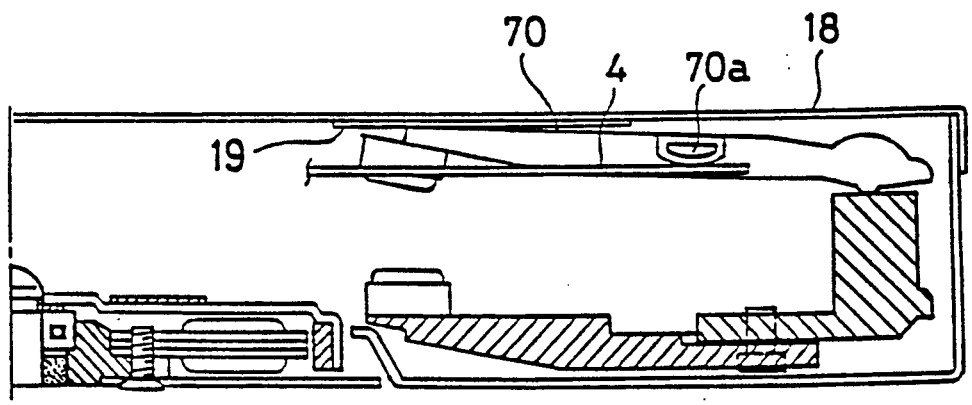
FIG. 18 is a side sectional view of the carriage, illustrating contact of an upper carriage with a casing of the disk drive apparatus.

Next, an adjustment of height of the upper carriage will be explained. FIGS. 18 and 19 are sectional views of the carriage. As discussed above, if the disk cartridge is not inserted into the holder 4, the raised member 70a of the upper carriage 70 is, as illustrated in FIG. 13, raised by engaging with the holder 4.

A problem serious to those who design the disk drive apparatus, however, arises, because the height of the holder 4 often varies due to a variety of differences which can occur during the manufacture of the various components forming the disk drive apparatus. To be specific, when decreasing the thickness of the disk drive apparatus, differences in the height of the upper head are caused between different disk drive apparatus. This leads to a problem wherein the disk cartridge interferes with the upper head during insertion and/or removal thereof, with the result being that the upper head is damaged.

In accordance with this embodiment, as illustrated in FIG. 18, the structure is such that the upper carriage 70 is raised by the holder 4. The top end of the upper carriage contacts the runner sheet 19 adhered to the upper shield cover 18. As depicted in FIG. 19, the height of the holder 4 fluctuates. (That is, the holder in FIG. 19 lifts the upper carriage higher than the holder 4 in FIG. 18.) However, the present structure is such that even when the upper carriage 70 is excessively raised, the fulcrum member 70b of the upper carriage 70 separates from the carriage base 60 to absorb the differences in the height of the holder 4. This occurs because upper carriage 70 is resiliently held on carriage base 60 between suspension 73 and spring 74. If upper carriage 70 were fixedly attached to carriage base 60, such excessive upward movement of the holder 4 would be transmitted to the entire carriage, possibly breaking the carriage base 60 or the lower carriage 66. Thus, with the present arrangement, even if the thickness of the respective elements forming the carriage are reduced, highly stable mass production is attainable without requiring special dimensional accuracies (high tolerances) for the respective members, and a requirement for infinitesimal adjustment and alignment during assembly.

Runner sheet 19 serves as a slide surface member in this embodiment, and is provided by adhering, e.g., a Teflon tape member to the upper shield cover 18 by adhering means such as an adhesive double coated tape. The provision of a sliding surface is not limited to the tape member but may involve the use of a thin plate member having a smooth surface such as a stainless steel plate, depending on the mutual sliding property with respect to the upper carriage 70.

Figure 20:
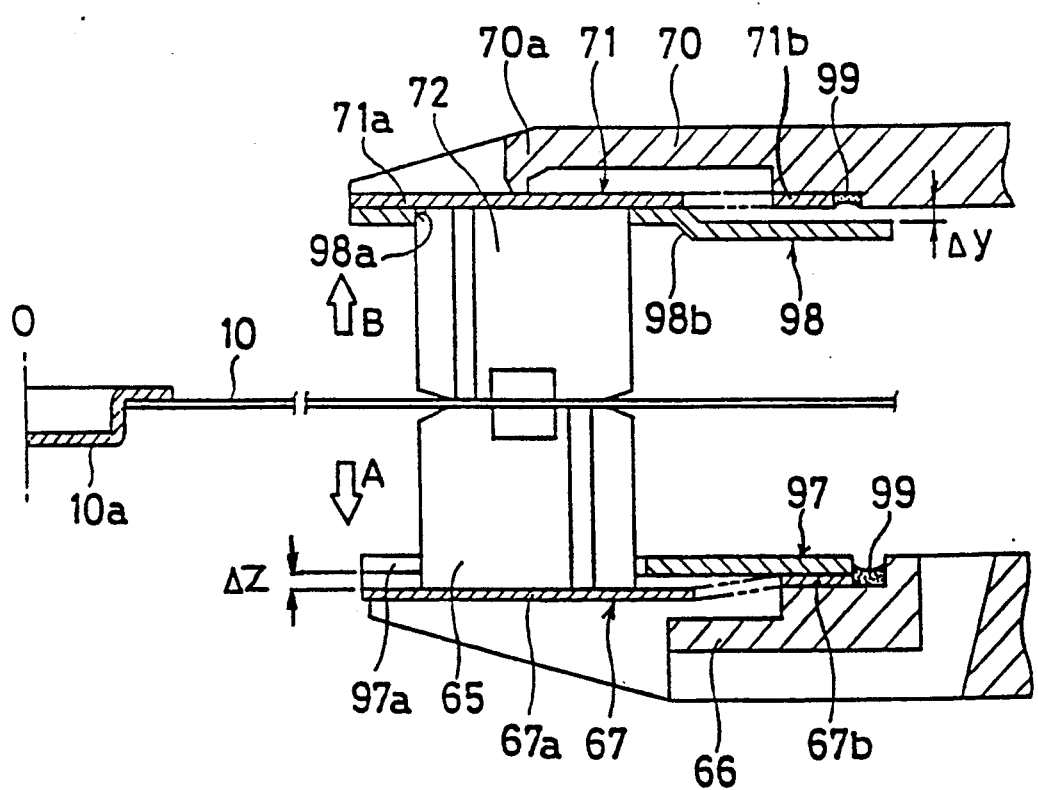
FIG. 20 is an enlarged side sectional view illustrating a principle portion of the head mounting mechanism.
Figure 21:
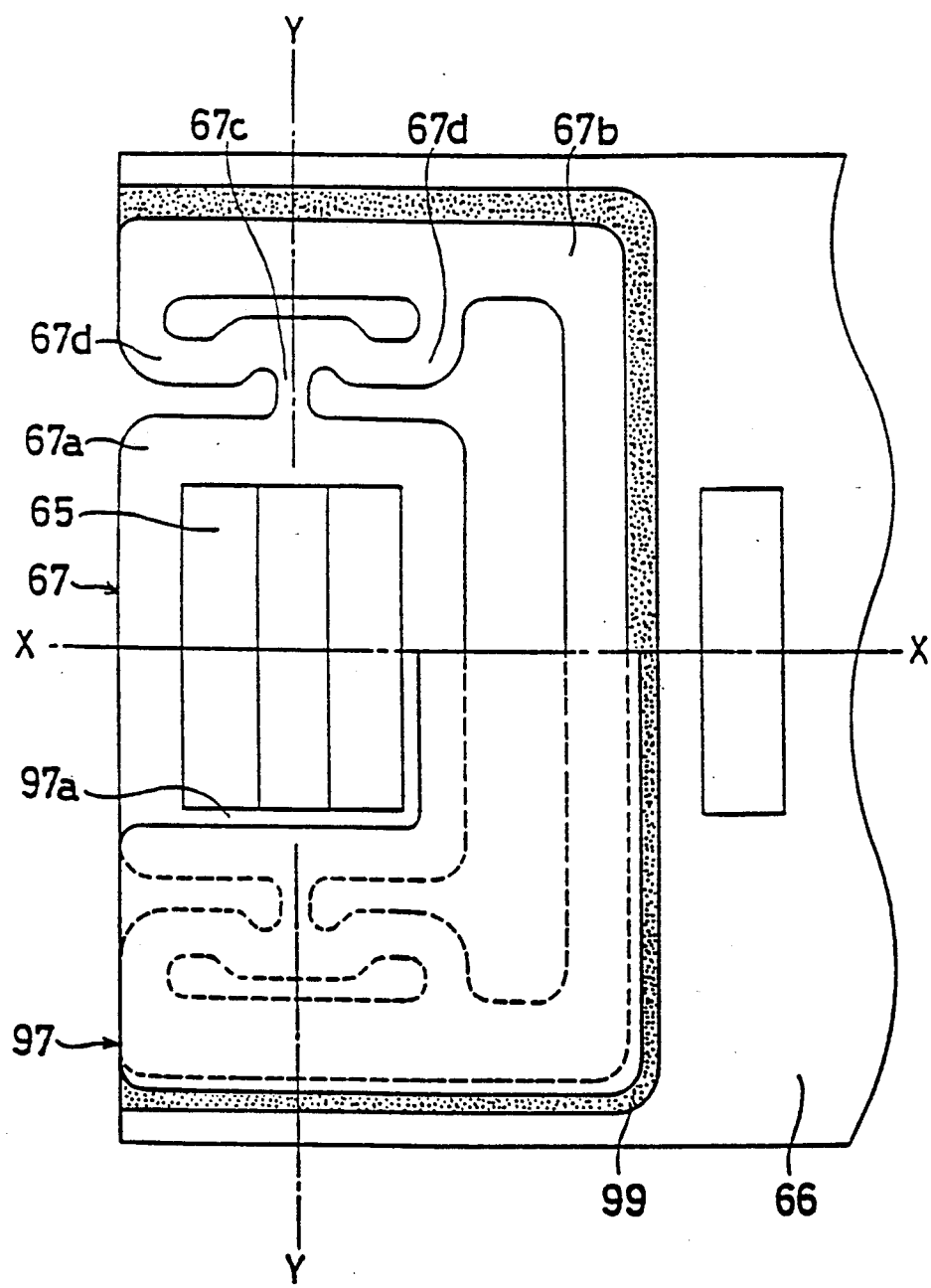
FIG. 21 is an overhead view of the lower head mounting structure taken in the direction A in FIG. 20.
Figure 22:
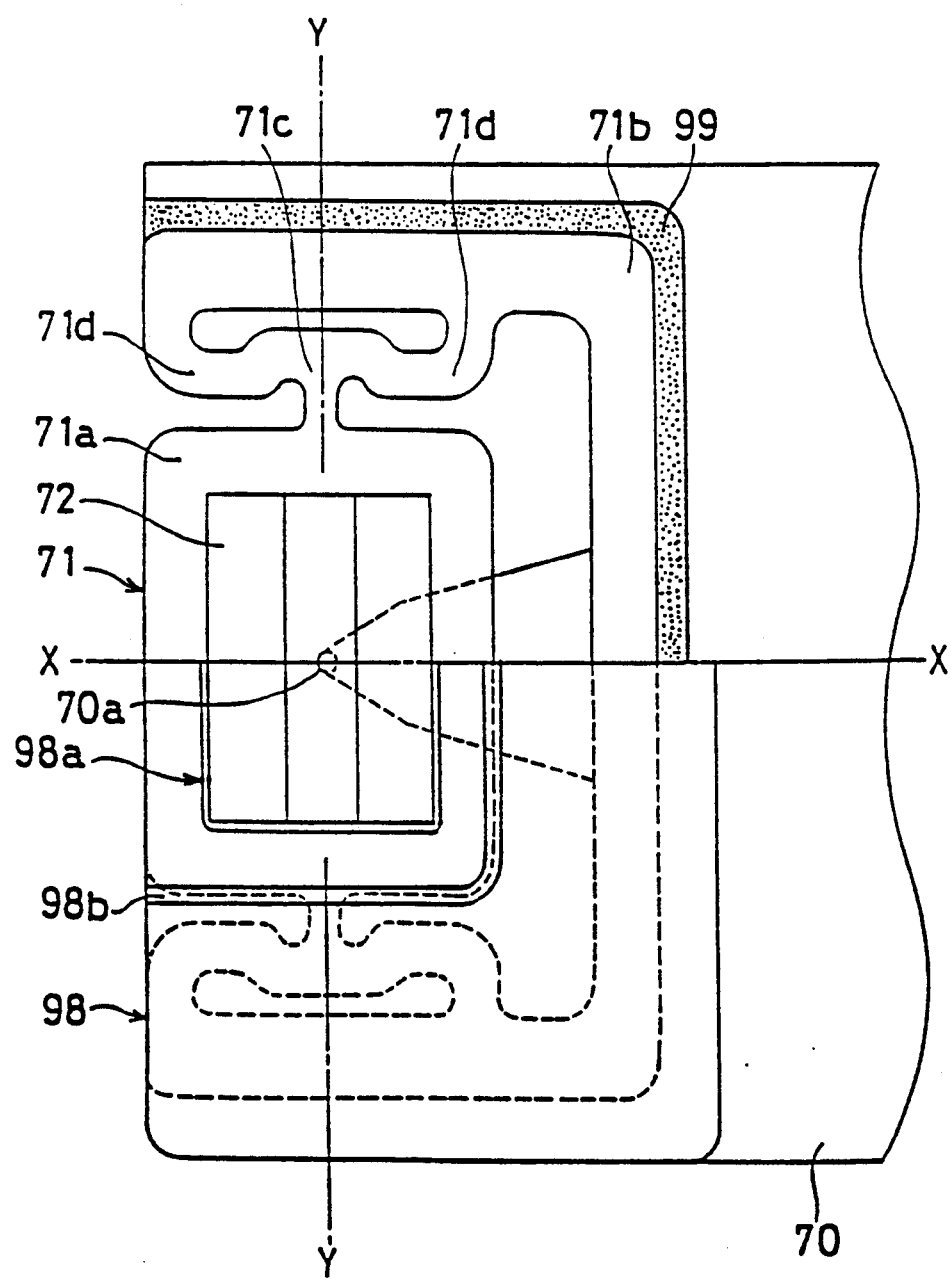
FIG. 22 is a plan view of the upper head mounting structure taken in the direction B in FIG. 20.
Figure 23:
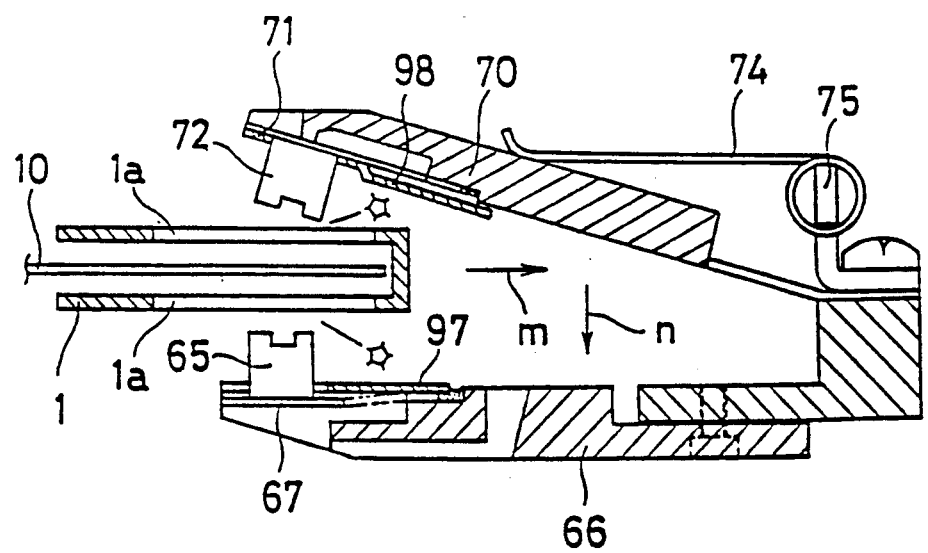
FIG. 23 is a side view of a carriage illustrating a problem which can occur in that inserted disk cartridges tend to contact heads during insertion and removal.
Figure 24:
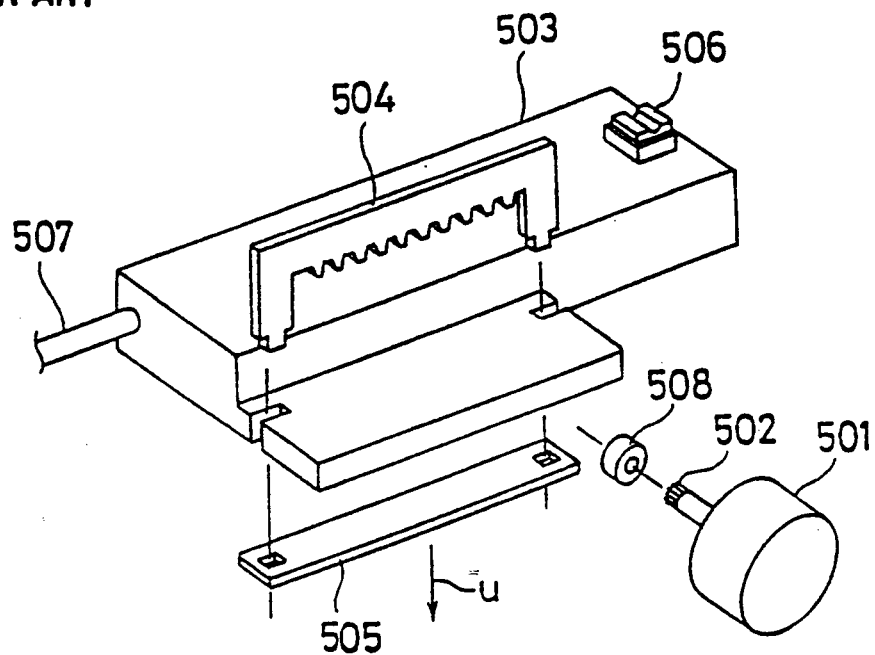
FIG. 24 is an exploded perspective view of a conventional carriage drive mechanism.
Figure 25:
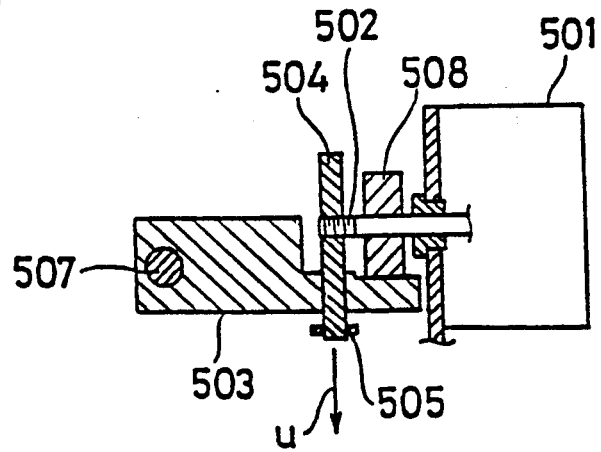
FIG. 25 is a front cross-sectional view of a conventional carriage drive mechanism.

FIGS. 20-23 show one example of the head mounting structure. FIG. 20 is a sectional view illustrating the principle portion of the head mounting structure. FIG. 21 is a plan view taken in the direction A of FIG. 20. FIG. 22 is a bottom view taken in the direction B of FIG. 20. FIG. 23 is a side view helpful in explaining a state of changing the disk. Note that the upper half portions of FIGS. 21 and 22 illustrate the respective members in half section with some portions removed.

Referring to FIGS. 20 through 22, the upper head 72 and the lower head 65 are mounted in the upper and lower carriages 70, 66 through gimbal springs 71, 67 exhibiting flexibility to provide a degree of kinetic freedom in the radial direction X—X and in the circumferential direction Y—Y of the flexible disk 10 mounted in the device. The lower carriage 66 is, as described above, constructed so as to be movable in the radial direction of the disk 10. The upper carriage 70 is fitted to the above-mentioned carriage base 60 so as to be openable and closable on the lower carriage 66. The upper carriage 70 is closed by a press member such as a head load spring 74 or the like, whereby the two heads 65, 72 can elastically slidably contact the disk 10 with a predetermined pressure provided by the gimbal springs 67, 71.

The gimbal spring 67 is formed of a substantially flat thin leaf spring in accordance with this preferred embodiment. The gimbal spring 67 includes, as illustrated in FIG. 21, a planar central portion 67a upon which head 65 is mounted, a planar outer peripheral portion 67b which is mounted on the carriage 66 and surrounds the central portion 67a, and a flexible portion for connecting the central portion 67a to the outer peripheral portion 67b to provide flexibility to the head mounting structure.

This flexible portion is provided at two lateral positions in the disk circumferential direction between the central portion 67a and the outer peripheral portion 67b. Each flexible portion includes a pair of connecting members 67c provided along the line Y—Y in FIG. 21 to provide a degree of kinetic freedom in the radial direction X—X of the disk, and a pair of arm members 67d, extending from the connecting members 67c and connected to the outer peripheral portion 67b, for providing a degree of kinetic freedom in the thicknesswise direction of the gimbal spring 67 and some degree of kinetic freedom in the direction Y—Y.

The other gimbal spring 71 based on the same structure as gimbal spring 67 is formed of the same material as gimbal spring 67 in accordance with this preferred embodiment. As illustrated in FIG. 22, the gimbal spring 71 includes a central portion 71a, an outer peripheral portion 71b and a flexible portion for connecting these two portions. The flexible portion is constructed of connecting members 71c and a pair of arm members 71d for each connecting member 71c.

Next, the head mounting structure of the respective heads in combination with the thus constructed gimbal springs 67, 71 will be described.

The lower head 65 and the upper head 72 are, as described above, constructed to slidably contact the disk 10 with a predetermined pressure. When cartridge 1 is inserted, lower head 65 drops by a predetermined distance due to flexure of the flexible portion (including the foregoing connecting members 67c and arm members 67d) caused by a predetermined pressure applied to lower head 65 (through flexible disk 10 by upper head 72 due to the force applied by spring 74), thus developing an equilibrium state with the predetermined pressure.

A gimbal protector 97, which functions as a cover member for covering the gimbal spring 67, is disposed on the surface of the gimbal spring 67 on the side of the head 65. The gimbal protector 97 is placed over the central portion 67a of the planar gimbal spring 67 and over the outer peripheral portion 67b, and is positioned such that an air gap having a quantity ΔZ (shown in FIG. 20) is formed between protector 97 and central portion 67a when no disk is loaded in the disk drive apparatus. The gimbal protector 97 is fixed together with the outer peripheral portion 67b by a fixing means such as, e.g., a bonding agent 99 or the like.

The gimbal protector 97 includes an opening 97a, through which the lower head 65 is inserted. The gimbal protector 97, though it does not hinder the degree of ordinary kinetic freedom of the lower head 65 as it follows any flexure of disk 10, is constructed to protect gimbal spring 67 from an excessive deformation by impinging on the central portion 67a of the gimbal spring 67 when the gimbal spring 67 is excessively deformed due to the action of, e.g., an unexpected disturbance applied thereto (or to head 65).

The upper head 72, facing the lower head 65, is supported substantially at its center on a pivot point 70a configured on the upper carriage 70 through the gimbal spring 71. As with the aforementioned lower head 65, the upper head 72 follows any flexure of the disk 10 with the aid of the flexible gimbal spring 71, thereby providing a consistent contact performance.

Gimbal spring 71 is supported on the pivot 70a in a substantially flat state. The outer peripheral portion 71b of gimbal spring 71 is fixed to the upper carriage 70 by fixing means such as a bonding agent 99 or the like.

A gimbal protector 98, which functions as a cover member for covering the gimbal spring 71, is disposed on a surface of the gimbal spring 71, on the side of the upper head 72. The gimbal protector 98 is formed with a stepped portion 98b to provide an air gap having a quantity Δy (shown in FIG. 20) with respect to the outer peripheral portion 71b of the gimbal spring 71 or the upper carriage 70.

Further, the protector 98 includes an opening 98a through which the upper head 72 is inserted. The protector 98 is fixed to the central portion 71a of gimbal spring 71, surrounding upper head 72, by fixing means such as, e.g., a bonding agent. Therefore, as with the foregoing gimbal protector 97, gimbal protector 98, though it does not hinder the degree of ordinary kinetic freedom to which the upper head 72 follows the flexure of disk 10, gimbal protector 98 prevents excessive deformation of gimbal spring 71 by impinging on the outer peripheral portion 71b of the gimbal spring 71 or the upper carriage 70 when the gimbal spring 71 is excessively deformed due to the action of, e.g., an unexpected disturbance.

Based on the construction discussed above, the disk 10 housed in the cartridge 1 is mounted between the lower head 65 mounted on the lower carriage 66 through the gimbal spring 67 and the upper head 72 mounted on the upper carriage 70 through the gimbal spring 71 while in an open state. At this time, the cartridge 1 is at first inserted in an arrowed direction m shown in FIG. 23 and reaches a predetermined position. Then, the cartridge 1 moves in an arrowed direction n with an operation of the previously described trigger mechanism and is mounted in a predetermined recording/reproducing position. Simultaneously, the upper carriage 70 moves in such a direction that the upper head 72 approaches the lower head 65, i.e., in the closing direction. The two heads 65, 72 come to confront a head window 1a formed in the cartridge 1, and are brought into a predetermined contact with the disk 10, thus effecting the recording/reproducing operations. When removing cartridge 1, the moving operations are performed in the reverse sequence to those described above.

The lower and upper heads, 65, 72 are, as described earlier, constructed to slidably contact the disk 10 with a predetermined pressure. The lower head 65 drops by a predetermined amount due to a flexure of the flexible portion including the foregoing connecting members 67c and arm members 67d with the predetermined pressure, thus developing an equilibrium state with the predetermined pressure. The lower head 65 follows any flexure of the disk 10 with the aid of the flexible gimbal spring 67 thereby improving the contact performance of the head.

In recent disk drive apparatus which attempt to reduce their thickness as much as possible, even in the open state of the upper carriage 70 illustrated in FIG. 23, the gap between the lower head 65 and the upper head 72 is narrow. When changing and removing the cartridge, there is an increasing possibility of interference occurring between the lower head 65 or the upper head 72 and a part of the cartridge 1 (i.e., the head window 1a formed in the cartridge 1). Based on the present construction, however, the gimbal protector 97 does not hinder the degree of ordinary kinetic freedom to which the lower head 65 follows any flexure of the disk 10. If the gimbal spring 67 is excessively deformed due to the action of, e.g., an expected disturbance, the gimbal protector 97 is capable of protecting the gimbal spring 67 from excessive deformation by impinging on the central portion 67a of the gimbal spring 67.

For instance, when encountering an abnormal state, e.g., when an unexpected disturbance such as a part of the cartridge 1 contacting a part of the lower head 65 during replacement of the disk 10 occurs, an excessive stress greater than the normal state is exerted on the flexible spring 67. Even in such a case, when the gimbal spring 67, though initially spaced by an air gap having a quantity ΔZ in FIG. 20, is deformed in excess of the air gap having the quantity ΔZ, the gimbal protector 97 (serving as a cover member for covering the gimbal spring 67 and incorporating the function as a displacement regulating means for regulating a quantity of displacement of the flexible portion of the gimbal spring) impinges on the central portion 67a of the gimbal spring 67. The gimbal protector 97 can thus prevent excessive deformation by regulating the maximum displacement of the spring 67.

As with the gimbal protector 97, the gimbal protector 98 prevents excessive deformation of the gimbal spring 71 without hindering the degree of ordinary kinetic freedom to which the upper head 72 follows any flexure of the disk 10. For example, even when excessive stress greater than the normal state is exerted on the gimbal spring 71 during the replacement of the disk 10, the gimbal spring, though initially spaced by the air gap having a quantity Δy in FIG. 20, is deformed in excess of the air gap having this quantity Δy, the gimbal protector 98 (incorporating the function of a cover member for covering the gimbal spring 71 and as a displacement regulating means) impinges on the outer peripheral portion 71b of the gimbal spring 71 or the upper carriage 70, thus protecting the gimbal spring 71 from excessive deformation. Thus, the gimbal protector 98 is capable of protecting at least the flexible portion of the gimbal spring 71.

Hence, there is no possibility of an accident occurring that will excessively deform the gimbal springs 67, 71. While providing such protection, it is still possible to maintain the appropriate contact performances of the lower head 65 and the upper head 72 with respect to any flexure of the disk 10. The gaps between the two heads 65, 72 and the cartridge 1 can be narrowed to the greatest possible degree. Accordingly, the described mounting structure means is feasible to stably provide a disk drive apparatus which is as thin as possible.

Note that the air gaps of $\Delta Z$, $\Delta y$ shown in FIG. 20 have magnitudes sufficient so as not to hinder the degree of ordinary kinetic freedom to which the lower and upper heads 65, 72 follow any flexure of the disk 10. The air gaps may be set to magnitudes sufficient to restrain the flexible portions of the gimbal springs 67, 71 to a deformation amount within their elastic deformation.

Further, the gimbal protector is fixed to the lower carriage 66 by fixing means such as a bonding agent 99 or the like in the embodiment discussed above. The fixing means is not, however, limited to adhesives. The gimbal protector may, as long as the air gap having the quantity $\Delta Z$ is maintained, be fixed directly to, e.g., the lower carriage 66. Further, in accordance with the described embodiment, the gimbal protector 98 impinges on the outer peripheral portion 71b of the gimbal spring 71 and the upper carriage 70, thereby preventing the deformation of the flexible portion of the gimbal spring 71. However, the gimbal protector 98 may, as long as the air gap having the quantity $\Delta y$ is effectively maintained, be structured to impinge on, for instance, either one of the outer peripheral portion 71b of the gimbal spring 71 and the upper carriage 70.

Moreover, according to the head mounting structure in the embodiment described above, the lower head 65 and the upper head 72 are structured to slidably contact the rotating disk 10 by the above-described pressure applying mechanism with predetermined pressures. The lower head 65 drops by a predetermined quantity due to flexure of the flexible portion consisting of the foregoing connecting members 67c and the arm members 67d, thus developing an equilibrium state with the predetermined pressure applied thereto. The lower head 65 follows any flexure of the disk 10 with the aid of the gimbal spring 67 thereby improving the contact performance. The upper head 72, facing toward the lower head 65, is supported substantially at its center on a pivot 70a configured on the upper carriage 70 through the gimbal spring 71. As with the aforementioned lower head 65, the upper head 72 follows any flexure of the disk 10 with the aid of the gimbal spring 71, thereby improving contact performance. The structure is not, however, limited to this combination. A construction the reverse of the above-mentioned construction may be provided, or the upper head 72 may have the same mounting structure as the lower head 65, or the lower head 65 may take the same mounting structure with the upper head 72.

As stated in, e.g., Japanese Laid-Open Patent Publication No. 167164/1982, the slidable contact conditions of heads with a rotating disk depend largely on the slide friction therebetween, more so that on other factors such as flexure in the radial direction and flexure attributed to the undulating phenomenon of the disk in the circumferential direction. More specifically, the upper and lower heads which slidably contact the rotating disk do not constantly perform a stable slide-contact with the disk. The heads, if observed infinitesimally, slidably contact the disk while repeating a so-called stick-slip phenomenon in the circumferential direction. This is a slide mechanism in which the disk is incrementally moved. If a repetitive frequency band of the stick-slip phenomenon substantially coincides with a spring constant of the connecting member of the gimbal spring which is provided in the disk radial direction, in some cases they are brought into a resonant phenomenon wherein a resonant sound referred to as a so-called "weeping phenomenon" is emitted; or there arises a problem in terms of compatibility of the regenerative signal due to a timing disturbance of the signal regenerated by the head.

In this respect, according to the head loading structure in the embodiment discussed above, the upper and lower heads 72, 65 are loaded on the carriages 70, 66 through the gimbal springs 71, 67, whereby the two heads 65, 72 follow any flexure of the disk 10. This arrangement is the same as that in the conventional example. However, the gimbal springs 67, 71 in accordance with this embodiment are, as described above, formed of thin leaf springs having substantially flat surfaces. These gimbal springs include the central portions 67a, 71a, the outer peripheral portions 67b, 71b and the flexible portions disposed on both sides of each head in the disk circumferential direction. The flexible portions are comprised of the pair of connecting members 67c, 71c provided in the disk circumferential direction and the pair of arm members 67d, 71d extending from the respective connecting members 67c, 71c towards the outer peripheral portions 67b, 71b. The connecting members 67c, 71c are constructed to provide the heads with the appropriate degree of freedom in the disk radial direction. The pair of arm members 67d, 71d impart a degree of kinetic freedom in the thicknesswise directions of the gimbal springs 67, 71 and some degree of kinetic freedom in the disk circumferential direction. The spring constants of the flexible portions configured by the arm members 67d, 71d can be set larger than in the prior art. Because of the larger spring constant, the spring constant does not coincide with the repetitive frequency band of the stick-slip phenomenon, as can occur in the prior art when the lower head 65 slidably contacts the disk 10. Therefore, the present mounting structure provides the advantage of eliminating the possibility of emission of the resonant sound known as the so-called "weeping phenomenon" or of causing the timing disturbance of the signals regenerated by the heads and the problem in the compatibility of the regenerative signals.

Additionally, as described above, the structure in which the flexible portions are disposed only in the circumferential direction of the disk 10 is effective in reducing the size of the disk drive apparatus. Because the configuration is simple, the possibility of being deformed and damaged due to, e.g., handling during mass production is extremely small. Further, it is unnecessary to increase the number and size of, as in the conventional example, flexible portions.

The displacement regulating means, such as the gimbal protectors 97, 98, are not limited to the gimbal structures shown in FIGS. 21 and 22 but may take the form of a variety of structures. For example, as disclosed in the above-mentioned publication, the displacement regulating means can be applied to such a structure in which there is provided a frame member between the planar central portion (on which the head is mounted) and the outer peripheral portion (mounted on the carriage) and which surrounds the central portion, wherein a gimbal spring is used for connecting the frame member, the central portion and the outer peripheral portion through the connecting members in the disk radial and circumferential directions.

As discussed above, the present invention exhibits the following advantages. In the disk drive apparatus for recording and reproducing signals by movement-positioning the head mounted on the carriage in the disk radial direction with the aid of the pinion provided on the output shaft of the step motor and the rack provided on the carriage, the rack is attached to the carriage through parallel leaf springs and press-engages with the pinion by providing a pre-load to the rack by means of the elastic restoring force caused by flexure of the parallel leaf springs. Hence, driving can be executed with no backlash in a state where the rack surely engages with the pinion. Accurate movement-positioning of the carriage can be effected. At the same time, even when a force caused by some impact is exerted thereto, it is possible to stably maintain the above-mentioned engagement state because the impact force is absorbed by the parallel leaf springs. It is thus feasible to provide a disk drive apparatus which is resistive to impact when being carried, which is required especially for the small-sized thin type computer. Additionally, the structure is more simple than conventional constructions, and the number of parts is reduced.

The step motor for driving the rack is mounted with its drive shaft parallel to the spindle of the spindle motor, unlike previous devices where the step motor drive shaft is perpendicular to the spindle. Since the height of the step motor is less than the diameter thereof, this permits the overall disk drive apparatus to be made thinner. Superior miniaturization and thinning of the disk drive apparatus of this type are attainable.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. In a disk drive apparatus wherein information is recorded and reproduced from a disk using a head mounted on a carriage which is moved in a radial direction of the disk, a carriage driving mechanism for moving the carriage in the radial direction of the disk, comprising:
   a step motor having a drive shaft and a pinion located at one end of said drive shaft;
   a rack including an elongate slot, plural teeth on one side of said slot, said pinion inserted into said slot so that said plural teeth are engaged with said pinion; and
   a pair of parallel leaf springs attached to said rack and having means for attachment to the carriage so that said pair of parallel leaf springs bias said plural teeth of said rack against said pinion, said parallel leaf springs being parallel to said elongate slot.

2. The carriage driving mechanism of claim 1, wherein said pair of parallel leaf springs are one-piece with said rack.

3. The carriage driving mechanism of claim 1, further comprising:
   a slide shaft, slidably attachable to the carriage, and slide shaft clamps attached to opposite ends of said slide shaft, and attachable to a base upon which said step motor is mountable.

4. The carriage driving mechanism of claim 1, wherein said means for attachment of the parallel leaf springs to the carriage attaches said parallel leaf springs to said carriage so that said rack is biases toward the carriage.

5. A disk drive apparatus comprising:
   a base;
   a spindle motor for rotating a disk and including a stator mounted to said base, a rotor rotatably mounted to said stator by a spindle, and a chucking mechanism for engaging and driving a disk;
   a head for recording and reproducing information on the disk;
   a carriage, said head mounted on said carriage, and
   a carriage driving mechanism for moving said carriage and had in a radial direction of the disk, said carriage driving mechanism including a rack attached to said carriage, a step motor having a drive shaft and a pinion located at one end of said drive shaft, and a biasing member attached between said carriage and said rack, biasing said rack toward said carriage, and biasing teeth on said rack against said pinion so that said pinion is engaging the teeth of said rack;
   wherein said step motor is mounted to said base so that said drive shaft is parallel to the spindle of said spindle motor.

6. The disk drive apparatus of claim 5, wherein said biasing member includes a pair of parallel leaf springs attached between said rack and said carriage so that said parallel leaf springs bias the teeth of said rack against said pinion.

7. The disk drive apparatus of claim 6, wherein said pair of parallel leaf springs are one-piece with said rack.

8. The disk drive apparatus of claim 6, wherein said rack includes an elongated slot extending parallel to said leaf springs and containing said teeth on one side of said slot, said pinion inserted in said slot so that said rack teeth are engaged with teeth on said pinion.

9. The disk drive apparatus of claim 6, further comprising:
   a slide shaft, slidably attached to the carriage, and slide shaft clamps attached to opposite ends of said slide shaft, and attached to said base.

10. The disk drive apparatus of claim 9, wherein said step motor includes a flange which engages said base, and said slide shaft clamps each include a presser spring member for pressing said step motor flange against said base to secure said step motor to said base.

11. The disk drive apparatus of claim 5, wherein said carriage driving step motor and said carriage are located on a first side of said base, said step motor shaft extends through an aperture in said base, and said rack and said pinion are located on a second side of said base, opposite from said first side.

12. A disk drive apparatus comprising:
   a base;
   a spindle motor for rotating a disk and including a stator mounted to said base, a rotor rotatably mounted to said stator by a spindle, and a chucking mechanism for engaging and driving a disk;

a head for recording and reproducing information on the disk;

a carriage, said head mounted on said carriage; and a carriage driving mechanism for moving said carriage and head in a radial direction of the disk, said carriage driving mechanism including:

a step motor having a drive shaft and a pinion located at one end of said drive shaft;

a rack including an elongate slot, plural teeth on one side of said slot, said pinion inserted into said slot so that said plural teeth are engaged with said pinion; and a pair of parallel leaf springs attached between said rack and said carriage so that said pair of parallel leaf springs bias the teeth of said rack against said pinion.

13. The disk drive apparatus of claim 12, wherein said pair of parallel leaf springs are one-piece with said rack.

14. The disk drive apparatus of claim 12, further comprising:

a slide shaft, slidably attached to the carriage, and slide shaft clamps attached to opposite ends of said slide shaft, and attached to said base.

15. The disk drive apparatus of claim 14, wherein said step motor includes a flange which engages said base, and said slide shaft clamps each include a presser spring member for pressing said step motor flange against said base to secure said step motor to said base.

16. The disk drive apparatus of claim 12, wherein said drive shaft of said step motor is parallel to said spindle, and said carriage driving step motor and said carriage are located on a first side of said base, said step motor shaft extends through an aperture in said base, and said rack and said pinion are located on a second side of said base, opposite from said first side.

17. The disk drive apparatus of claim 12, wherein said slot is parallel to said pair of parallel leaf springs.

18. In a disk drive apparatus wherein information in recorded and reproduced from a disk using a head mounted on a carriage which is moved in a radial direction of the disk, a carriage driving mechanism for moving the carriage in the radial direction of the disk, comprising:

a step motor having a drive shaft and a pinion located at one end of said drive shaft;

a rack including plural teeth on one side of said rack, said plural teeth being engaged with said pinion; and a first leaf spring and a second leaf spring, said first and second leaf springs being parallel to each other, first ends of said first and second parallel leaf springs being attached to a central portion of said rack, second ends of said first and second parallel leaf springs having means for attachment to the carriage, said first and second parallel leaf springs biasing said rack against said pinion.

19. The carriage driving mechanism of claim 18, wherein said means for attachment of the first and second parallel leaf springs to the carriage attaches said first and second parallel leaf springs to said carriage so that said rack is biased toward the carriage.

20. The carriage driving mechanism of claim 18, wherein said rack includes an elongate slot, said plural teeth located on one side of said slot, said pinion inserted into said slot so that said plural teeth are engaged with said pinion; and said parallel leaf springs are parallel to said elongate slot.

* * * * *